(12) United States Patent
Onodera et al.

(10) Patent No.: US 11,094,465 B2
(45) Date of Patent: *Aug. 17, 2021

(54) ELECTRONIC COMPONENT WITH EXTERNAL ELECTRODES INCLUDING CONDUCTIVE RESIN LAYER

(71) Applicant: TDK CORPORATION, Tokyo (JP)

(72) Inventors: Shinya Onodera, Tokyo (JP); Takehisa Tamura, Tokyo (JP); Ken Morita, Tokyo (JP)

(73) Assignee: TDK CORPORATION, Tokyo (JP)

( * ) Notice: Subject to any disclaimer, the term of this patent is extended or adjusted under 35 U.S.C. 154(b) by 126 days.

This patent is subject to a terminal disclaimer.

(21) Appl. No.: 16/250,609

(22) Filed: Jan. 17, 2019

(65) Prior Publication Data
US 2019/0237259 A1    Aug. 1, 2019

(30) Foreign Application Priority Data

Jan. 31, 2018  (JP) .............................. JP2018-015113

(51) Int. Cl.
*H01G 4/232*     (2006.01)
*H01G 4/30*      (2006.01)
*H01G 4/005*     (2006.01)
*H01G 4/248*     (2006.01)
*H01G 4/12*      (2006.01)

(52) U.S. Cl.
CPC .......... *H01G 4/2325* (2013.01); *H01G 4/005* (2013.01); *H01G 4/248* (2013.01); *H01G 4/30* (2013.01); *H01G 4/12* (2013.01)

(58) Field of Classification Search
CPC ........ H01G 4/2325; H01G 4/30; H01G 4/232; H01G 4/12; H01G 2/06
See application file for complete search history.

(56) References Cited

U.S. PATENT DOCUMENTS

2015/0077898 A1\*   3/2015  Chung ................... H01G 4/232
                                              361/301.4
2016/0351332 A1    12/2016  Lee et al.
(Continued)

FOREIGN PATENT DOCUMENTS

CN       107452464 A    12/2017
JP       H08-107038 A   4/1996
(Continued)

*Primary Examiner* — David M Sinclair
(74) *Attorney, Agent, or Firm* — Oliff PLC

(57) ABSTRACT

An element body of a rectangular parallelepiped shape includes a principal surface arranged to constitute a mounting surface, a pair of side surfaces opposing each other and adjacent to the principal surface, and a pair of end surfaces opposing each other and adjacent to the principal surface and the pair of side surfaces. An external electrode includes a sintered metal layer disposed on an end portion of the element body, and a conductive resin layer including a portion positioned on the principal surface and a portion positioned on the sintered metal layer. An end edge of the sintered metal layer is positioned closer to the end surface than a maximum thickness position of the portion positioned on the principal surface. A thickness of the conductive resin layer gradually decreases from the maximum thickness position to the portion positioned on the sintered metal layer.

35 Claims, 22 Drawing Sheets

(56) References Cited

U.S. PATENT DOCUMENTS

| | | | |
|---|---|---|---|
| 2017/0098506 A1* | 4/2017 | Ando | .................... H01G 4/232 |
| 2017/0186538 A1 | 6/2017 | Ando et al. | |
| 2017/0345553 A1 | 11/2017 | Shimoyasu et al. | |
| 2020/0185144 A1 | 6/2020 | Shimoyasu et al. | |

FOREIGN PATENT DOCUMENTS

| | | | | |
|---|---|---|---|---|
| JP | 2008-181956 A | | 8/2008 | |
| JP | 2009200421 A | * | 9/2009 | ........... H01G 4/2325 |
| JP | 2009218353 A | * | 9/2009 | |
| JP | 2010-226017 A | | 10/2010 | |
| JP | 2012-038917 A | | 2/2012 | |
| JP | 2012169334 A | * | 9/2012 | |
| JP | 2017-120819 A | | 7/2017 | |
| JP | 2017152556 A | * | 8/2017 | |
| JP | 2017-216288 A | | 12/2017 | |
| KR | 10-2016-0139932 A | | 12/2016 | |

\* cited by examiner

ELECTRONIC COMPONENT WITH EXTERNAL ELECTRODES INCLUDING CONDUCTIVE RESIN LAYER

BACKGROUND OF THE INVENTION

1. Field of the Invention

The present invention relates to an electronic component.

2. Description of Related Art

Known electronic components include an element body of a rectangular parallelepiped shape and a plurality of external electrodes (see, for example, Japanese Unexamined Patent Publication No. H8-107038). The element body includes a principal surface arranged to constitute a mounting surface, a pair of side surfaces opposing each other, and a pair of end surfaces opposing each other. The plurality of external electrodes is disposed at both end portions of the element body in a direction in which the pair of end surfaces opposes each other. The external electrode includes a sinter metal layer disposed on the end portion of the element body, and a conductive resin layer disposed on the sinter metal layer.

SUMMARY OF THE INVENTION

An object of one aspect of the present invention is to provide an electronic component that suppresses occurrence of a crack in an element body.

An electronic component according to one aspect includes an element body of a rectangular parallelepiped shape and a plurality of external electrodes. The element body includes a principal surface arranged to constitute a mounting surface, a pair of side surfaces opposing each other and adjacent to the principal surface, and a pair of end surfaces opposing each other and adjacent to the principal surface and the pair of side surfaces. The plurality of external electrodes is disposed at both end portions of the element body in a first direction in which the pair of end surfaces opposes each other. The external electrode includes a sintered metal layer disposed on the end portion of the element body, and a conductive resin layer including a portion positioned on the principal surface and a portion positioned on the sintered metal layer. In the first direction, an end edge of the sintered metal layer is positioned closer to the end surface than a maximum thickness position of the portion positioned on the principal surface. A thickness of the conductive resin layer gradually decreases from the maximum thickness position to the portion positioned on the sintered metal layer.

In a case in which the electronic component is solder-mounted on an electronic device, external force applied onto the electronic component from the electronic device may act as stress on the element body. The electronic device includes, for example, a circuit board or an electronic component. The external force acts on the element body from a solder fillet formed at the solder-mounting, through the external electrode. The stress tends to concentrate on an end edge of the sintered metal layer. Therefore, a crack may occur in the element body with the end edge of the sintered metal layer as a starting point.

In the one aspect, the end edge of the sintered metal layer is positioned closer to the end surface than the maximum thickness position of the portion positioned on the principal surface. Therefore, the conductive resin layer reliably covers the end edge of the sintered metal layer. Even in a case in which the external force acts on the electronic component from the solder fillet, the stress tends not to concentrate on the end edge of the sintered metal layer. The end edge of the sintered metal layer tends not to serve as the starting point of a crack. Consequently, the one aspect suppresses occurrence of a crack in the element body.

In the one aspect, the thickness of the conductive resin layer gradually decreases from the maximum thickness position to the portion positioned on the sintered metal layer. In the one aspect, a surface profile of the external electrode varies smoothly, as compared with an electronic component in which a thickness of the conductive resin layer is constant. Therefore, the one aspect distributes the external force applied onto the external electrode, and thus reduces the stress concentrating on the end edge of the sintered metal layer. Consequently, the one aspect further suppresses the occurrence of a crack in the element body.

In the one aspect, a length from the end edge of the sintered metal layer to the maximum thickness position, in the first direction may be larger than a length from a reference plane to the end edge of the sintered metal layer, in the first direction. The reference plane is defined as a plane including the end surface. This configuration further reduces the stress concentrating on the end edge of the sintered metal layer. Therefore, this configuration further suppresses the occurrence of a crack in the element body.

In the one aspect, the sintered metal layer may include no portion positioned on the principal surface. In this case, the end edge of the sintered metal layer is not positioned on the principal surface. In an electronic component in which the end edge of the sintered metal layer is positioned on the principal surface, the stress tends to concentrate on the end edge of the sintered metal layer, as compared with a configuration in which the end edge of the sintered metal layer is not positioned on the principal surface. Therefore, in this configuration, the stress tends not to concentrate on the end edge of the sintered metal layer. Consequently, this configuration further suppresses the occurrence of a crack in the element body.

In the one aspect, a length from the maximum thickness position to an end edge of the conductive resin layer, in the first direction may be larger than a length from a reference plane to the maximum thickness position, in the first direction. The reference plane is defined as a plane including the end surface.

In a case in which the external force acts on the end edge of the conductive resin layer, the conductive resin layer may peel off from the element body with the end edge as a starting point. In a configuration in which the length, in the first direction, from the maximum thickness position to the end edge of the conductive resin layer is larger than the length, in the first direction, from the reference plane to the maximum thickness position, bonding strength between the conductive resin layer and the element body is large, as compared with an electronic component in which the length, in the first direction, from the maximum thickness position to the end edge of the conductive resin layer is equal to or smaller than the length, in the first direction, from the reference plane to the maximum thickness position. Therefore, in this configuration, the conductive resin layer tends not to peel off from the element body.

In the one aspect, a length from the maximum thickness position to an end edge of the conductive resin layer, in the first direction may be larger than a length from the end edge of the sintered metal layer to the maximum thickness position, in the first direction. In this configuration, volume of the portion positioned on the principal surface is large, as compared with an electronic component in which the length, in the first direction, from the maximum thickness position to the end edge of the conductive resin layer is equal to or smaller than the length, in the first direction, from the end edge of the sintered metal layer to the maximum thickness position. Therefore, this configuration further reduces the stress concentrating on the end edge of the sintered metal layer. Consequently, this configuration further suppresses the occurrence of a crack in the element body.

In the one aspect, the thickness of the conductive resin layer may gradually decrease from the maximum thickness position to an end edge of the conductive resin layer. In this configuration, the external force tends not to act on the end edge of the conductive resin layer, as compared with an electronic component in which a thickness of the conductive resin layer is constant. Therefore, in this configuration, the conductive resin layer tends not to peel off from the element body.

In the one aspect, when viewed from the first direction, a thickness of the portion positioned on the principal surface may be larger at a center in a second direction in which the pair of side surfaces opposes each other than at an end in the second direction. In this configuration, the surface profile of the external electrode varies more smoothly, as compared with an electronic component in which a thickness of the portion positioned on the principal surface is constant. Therefore, this configuration further distributes the external force applied onto the external electrode, and thus further reduces the stress concentrating on the end edge of the sintered metal layer.

In the one aspect, the conductive resin layer may include a portion positioned on the side surface. A maximum thickness of the portion positioned on the principal surface may be larger than a maximum thickness of the portion positioned on the side surface. This configuration reduces the stress concentrating on the end edge of the sintered metal layer, as compared with an electronic component in which the maximum thickness of the portion positioned on the principal surface is equal to or smaller than the maximum thickness of the portion positioned on the side surface. Therefore, this configuration further suppresses the occurrence of a crack in the element body.

In the one aspect, a maximum thickness of the portion positioned on the principal surface may be equal to or larger than 30 μm. This configuration reduces the stress concentrating on the end edge of the sintered metal layer, as compared with an electronic component in which the maximum thickness of the portion positioned on the principal surface is smaller than 30 μm. Therefore, this configuration further suppresses the occurrence of a crack in the element body.

In the one aspect, the element body may include a curved surface positioned between the end surface and the principal surface and having a predetermined radius of curvature. The sinter metal layer may be disposed on the end surface and on the curved surface. In a cross-section orthogonal to the end surface and the principal surface, a radius of curvature of a surface of the conductive resin layer may be larger than the predetermined radius of curvature, and larger than a radius of curvature of a surface of the sinter metal layer. In this configuration, the surface profile of the external electrode varies more smoothly. Therefore, this configuration further distributes the external force applied onto the external electrode, and thus further reduces the stress concentrating on the end edge of the sintered metal layer.

In the one aspect, the conductive resin layer may continuously cover one part of the principal surface, one part of the end surface, and one part of each of the pair of side surfaces. A region between the element body and the conductive resin layer may include a path through which moisture infiltrates. In a case in which moisture infiltrates from the region between the element body and the conductive resin layer, durability of the electronic component decreases. This configuration includes few paths through which moisture infiltrates, as compared with an electronic component in which the conductive resin layer covers the entire end surface, one part of each of the principal surfaces, and one part of each of the pair of side surfaces. Therefore, this configuration improves moisture resistance reliability.

The present invention will become more fully understood from the detailed description given hereinafter and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF EMBODIMENTS

Figure 1:
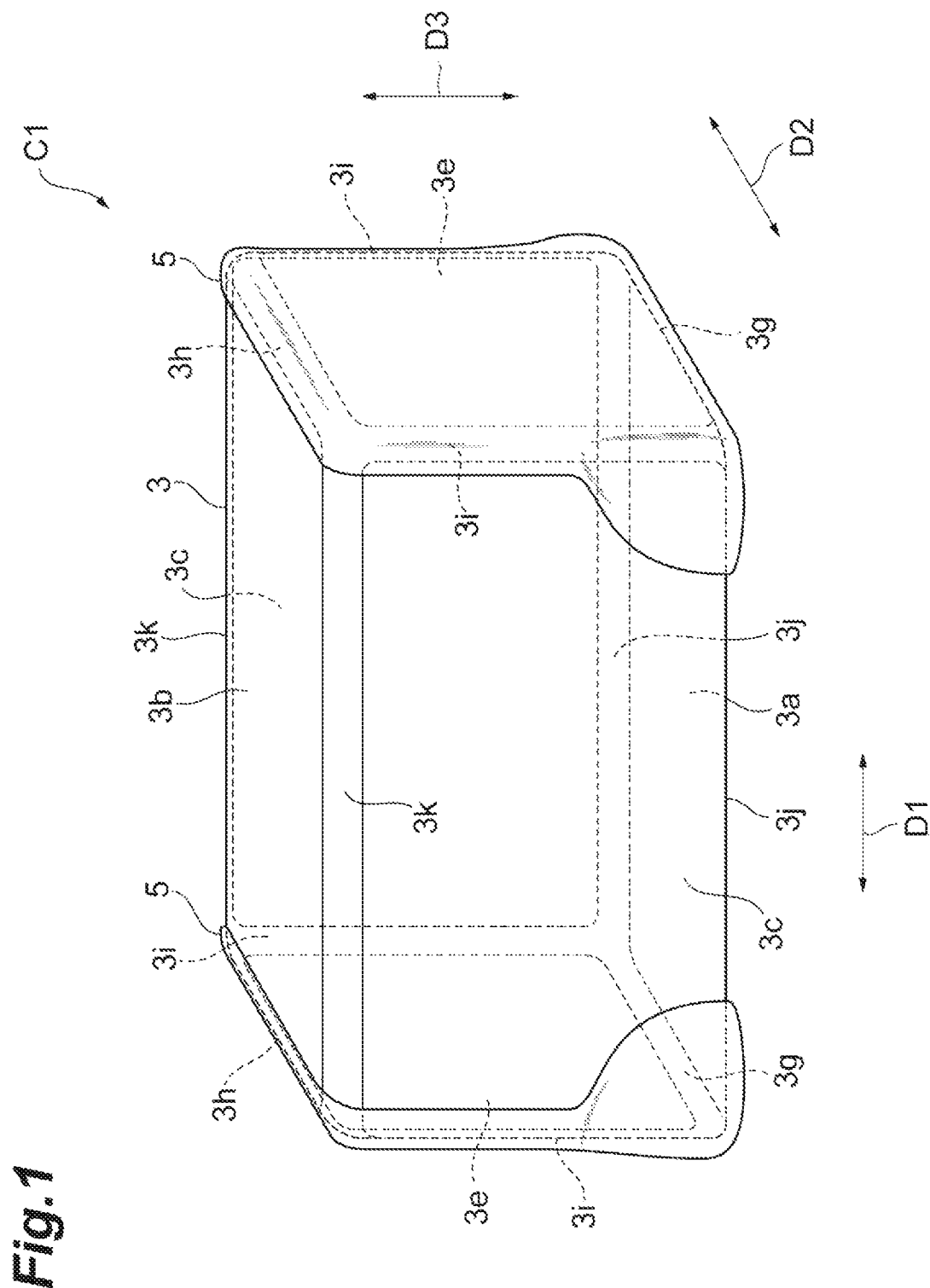
FIG. 1 is a perspective view of a multilayer capacitor according to a first embodiment.

Hereinafter, embodiments of the present invention will be described in detail with reference to the accompanying drawings. In the following description, the same elements or elements having the same functions are denoted with the same reference numerals and overlapped explanation is omitted.

First Embodiment

Figure 2:
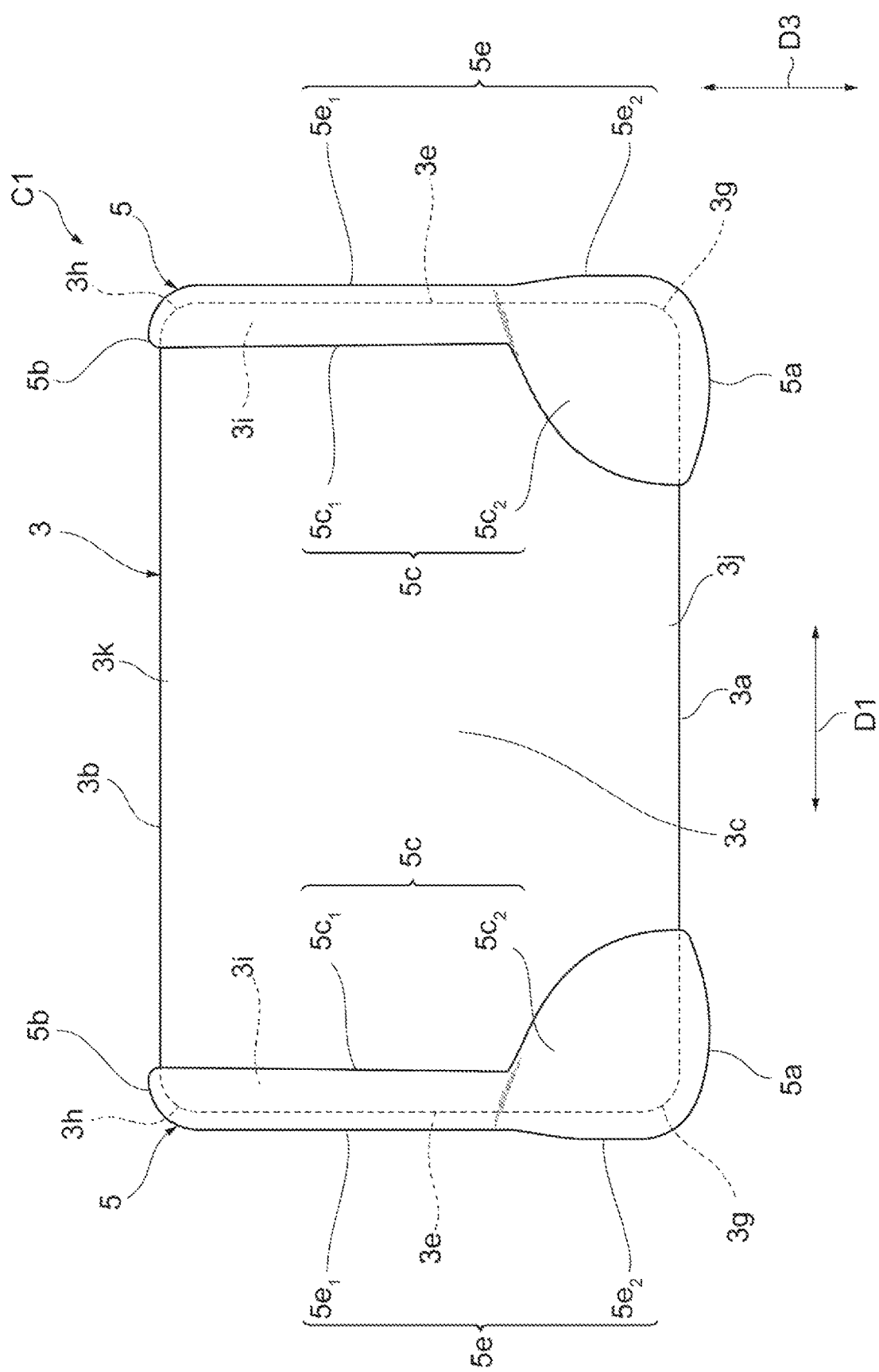
FIG. 2 is a side view of the multilayer capacitor according to the first embodiment.
Figure 3:
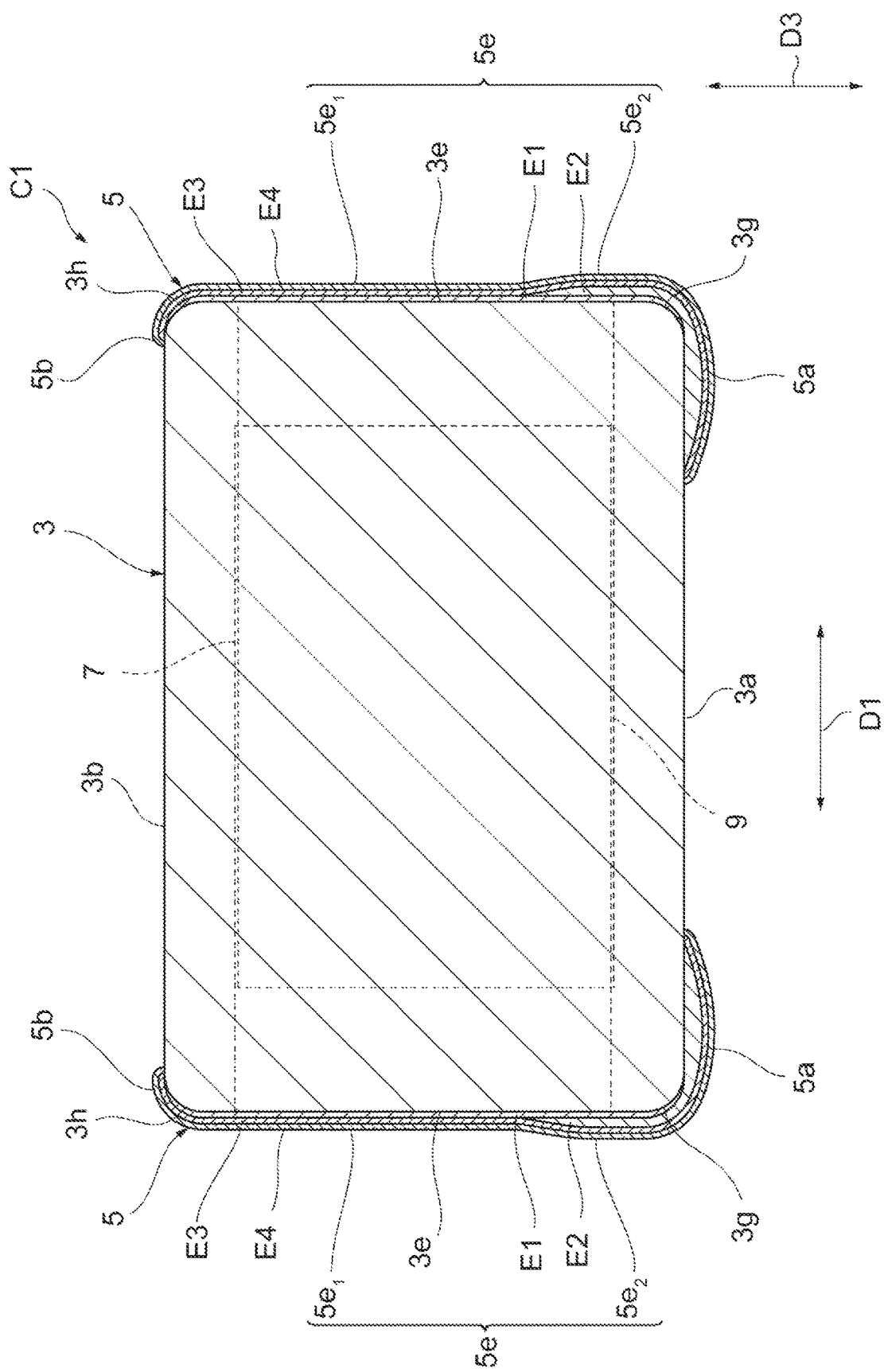
FIG. 3 is a view illustrating a cross-sectional configuration of the multilayer capacitor according to the first embodiment.
Figure 7:
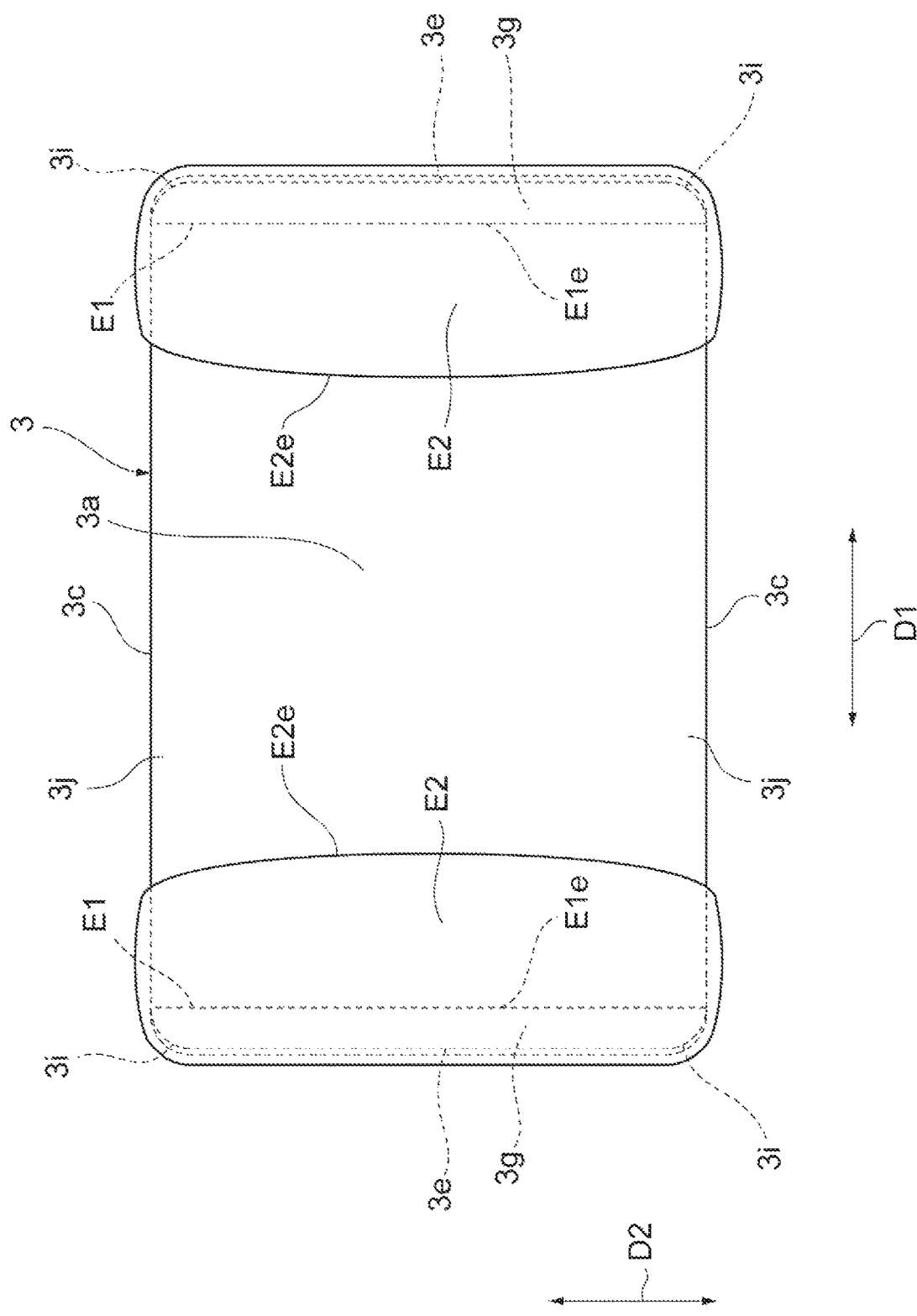
FIG. 7 is a plan view illustrating an element body, a first electrode layer, and a second electrode layer.
Figure 8:
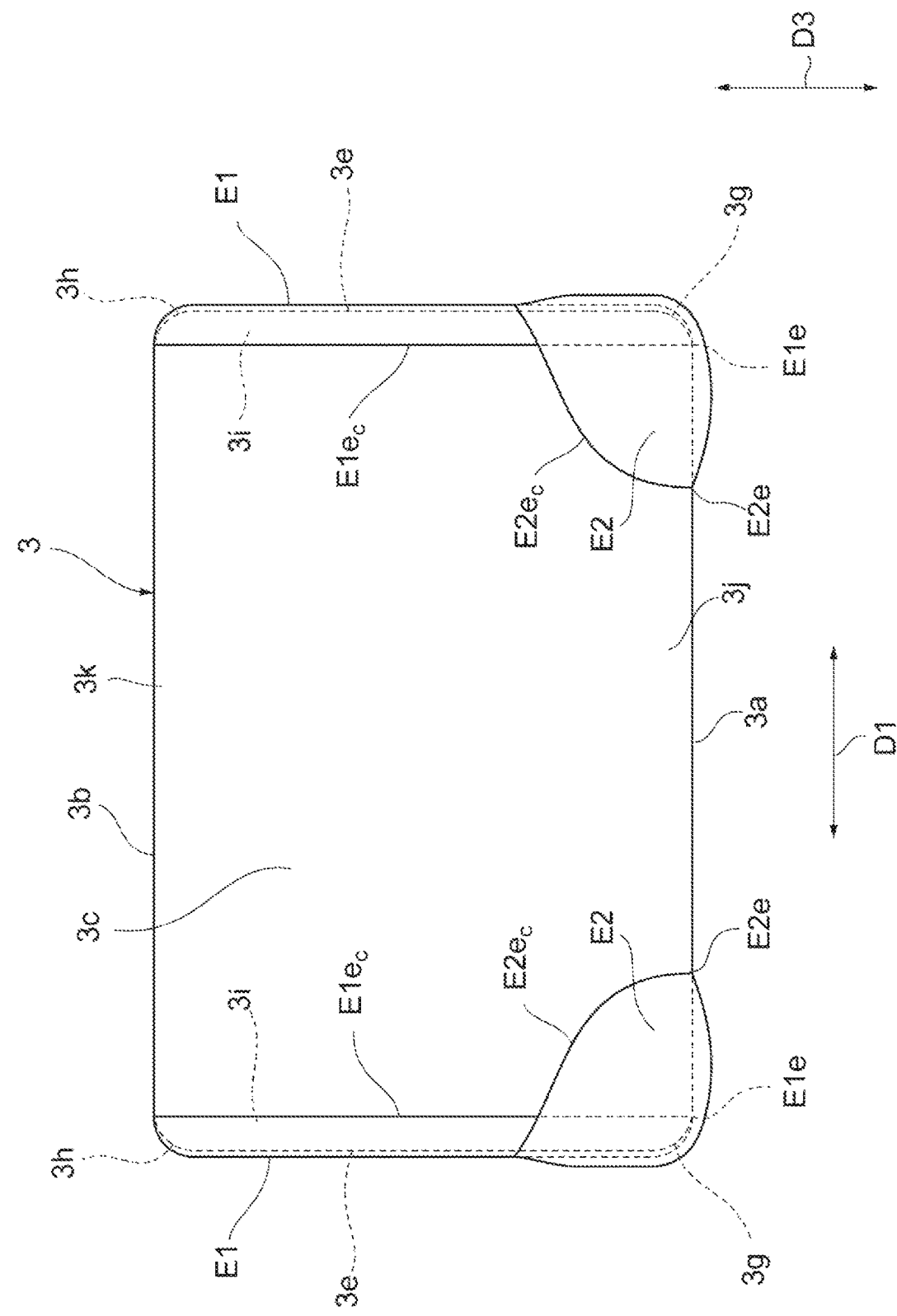
FIG. 8 is a side view illustrating the element body, the first electrode layer, and the second electrode layer.
Figure 9:
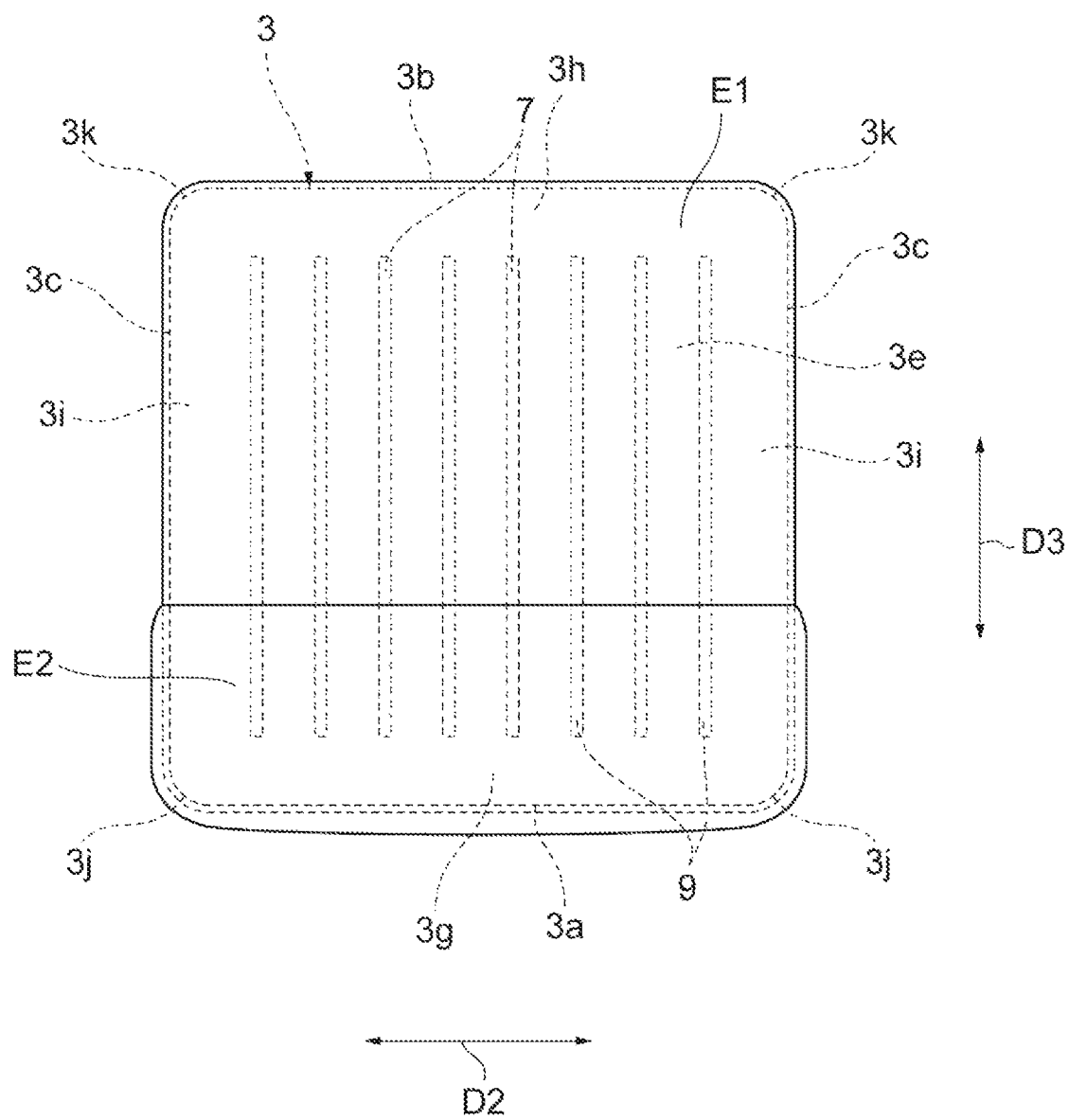
FIG. 9 is an end view illustrating the element body, the first electrode layer, and the second electrode layer.

A configuration of a multilayer capacitor C1 according to a first embodiment will be described with reference to FIGS. 1 to 9. FIG. 1 is a perspective view of the multilayer capacitor according to the first embodiment. FIG. 2 is a side view of the multilayer capacitor according to the first embodiment. FIGS. 3 to 6 are views illustrating a cross-sectional configuration of the multilayer capacitor according to the first embodiment. FIG. 7 is a plan view illustrating an element body, a first electrode layer, and a second electrode layer. FIG. 8 is a side view illustrating the element body, the first electrode layer, and the second electrode layer. FIG. 9 is an end view illustrating the element body, the first electrode layer, and the second electrode layer. In the first embodiment, an electronic component is, for example, the multilayer capacitor C1.

As illustrated in FIG. 1, the multilayer capacitor C1 includes an element body 3 of a rectangular parallelepiped shape and a plurality of external electrodes 5. In the present embodiment, the multilayer capacitor C1 includes a pair of external electrodes 5. The pair of external electrodes 5 is disposed on an outer surface of the element body 3. The pair of external electrodes 5 is separated from each other. The rectangular parallelepiped shape includes a rectangular parallelepiped shape in which corners and ridges are chamfered, and a rectangular parallelepiped shape in which the corners and ridges are rounded.

The element body 3 includes a pair of principal surfaces 3a and 3b opposing each other, a pair of side surfaces 3c opposing each other, and a pair of end surfaces 3e opposing each other. The pair of principal surfaces 3a and 3b and the pair of side surfaces 3c have a rectangular shape. The direction in which the pair of end surfaces 3e opposes each other is a first direction D1. The direction in which the pair of side surfaces 3c opposes each other is a second direction D2. The direction in which the pair of principal surfaces 3a and 3b opposes each other is a third direction D3. The multilayer capacitor C1 is solder-mounted on an electronic device. The electronic device includes, for example, a circuit board or an electronic component. The principal surface 3a of the multilayer capacitor C1 opposes the electronic device. The principal surface 3a is arranged to constitute a mounting surface. The principal surface 3a is the mounting surface.

The first direction D1 is a direction orthogonal to the respective end surfaces 3e and is orthogonal to the second direction D2. The third direction D3 is a direction parallel to the respective end surfaces 3e and the respective side surfaces 3c, and is orthogonal to the first direction D1 and the second direction D2. The second direction D2 is a direction orthogonal to the respective side surfaces 3c. The third direction D3 is a direction orthogonal to the respective principal surfaces 3a and 3b. In the present embodiment, a length of the element body 3 in the first direction D1 is larger than a length of the element body 3 in the third direction D3, and larger than a length of the element body 3 in the second direction D2. The first direction D1 is a longitudinal direction of the element body 3.

The pair of side surfaces 3c extends in the third direction D3 to couple the pair of principal surfaces 3a and 3b. The pair of side surfaces 3c also extends in the first direction D1. The pair of end surfaces 3e extends in the third direction D3 to couple the pair of principal surfaces 3a and 3b. The pair of end surfaces 3e extends in the second direction D2.

The element body 3 includes a pair of ridge portions 3g, a pair of ridge portions 3h, four ridge portions 3i, a pair of ridge portions 3j, and a pair of ridge portions 3k. The ridge portion 3g is positioned between the end surface 3e and the principal surface 3a. The ridge portion 3h is positioned between the end surface 3e and the principal surface 3b. The ridge portion 3i is positioned between the end surface 3e and the side surface 3c. The ridge portion 3j is positioned between the principal surface 3a and the side surface 3c. The ridge portion 3k is positioned between the principal surface 3b and the side surface 3c. In the present embodiment, each of the ridge portions 3g, 3h, 3i, 3j, and 3k is rounded to curve. The element body 3 is subject to what is called a round chamfering process. Each of the ridge portions 3g, 3h, 31, 3j, and 3k includes a curved surface having a predetermined radius of curvature. In the present embodiment, the radii of curvature of the ridge portions 3g, 3h, 31, 3j, and 3k (curved surfaces) are approximately equivalent to each other. The radii of curvature of the ridge portions 3g, 3h, 3i, 3j, and 3k (curved surfaces) may be different from each other.

The end surface 3e and the principal surface 3a are indirectly adjacent to each other with the ridge portion 3g between the end surface 3e and the principal surface 3a. The end surface 3e and the principal surface 3b are indirectly adjacent to each other with the ridge portion 3h between the end surface 3e and the principal surface 3b. The end surface 3e and the side surface 3c are indirectly adjacent to each other with the ridge portion 3i between the end surface 3e and the side surface 3c. The principal surface 3a and the side surface 3c are indirectly adjacent to each other with the ridge portion 3j between the principal surface 3a and the side surface 3c. The principal surface 3b and the side surface 3c are indirectly adjacent to each other with the ridge portion 3k between the principal surface 3b and the side surface 3c.

The element body 3 is configured by laminating a plurality of dielectric layers in the second direction D2. The element body 3 includes the plurality of laminated dielectric layers. In the element body 3, a lamination direction of the plurality of dielectric layers coincides with the second direction D2. Each dielectric layer includes, for example, a sintered body of a ceramic green sheet containing a dielectric material. The dielectric material includes, for example, a dielectric ceramic of $BaTiO_3$ base, $Ba(Ti,Zr)O_3$ base, or $(Ba,Ca)TiO_3$ base. In an actual element body 3, each of the dielectric layers is integrated to such an extent that a boundary between the dielectric layers cannot be visually recognized. In the element body 3, the lamination direction of the plurality of dielectric layers may coincide with the third direction D3.

As illustrated in FIGS. 3 to 6, the multilayer capacitor C1 includes a plurality of internal electrodes 7 and a plurality of internal electrodes 9. Each of the internal electrodes 7 and 9 is an internal conductor disposed in the element body 3. Each of the internal electrodes 7 and 9 is made of a conductive material that is commonly used as an internal conductor of a multilayer electronic component. The conductive material includes, for example, a base metal. The conductive material includes, for example, Ni or Cu. Each of the internal electrodes 7 and 9 is configured as a sintered body of conductive paste containing the conductive material described above. In the present embodiment, the internal electrodes 7 and 9 are made of Ni.

The internal electrodes 7 and the internal electrodes 9 are disposed in different positions (layers) in the second direction D2. The internal electrodes 7 and the internal electrodes 9 are alternately disposed in the element body 3 to oppose each other in the second direction D2 with an interval therebetween. Polarities of the internal electrodes 7 and the internal electrodes 9 are different from each other. In a case in which the lamination direction of the plurality of dielectric layers is the third direction D3, the internal electrodes 7 and the internal electrodes 9 are disposed in different positions (layers) in the third direction D3. Each of the internal electrodes 7 and 9 includes one end exposed to a corresponding end surface 3e of the pair of end surfaces 3e. The plurality of internal electrodes 7 and the plurality of internal electrodes 9 are alternately disposed in the second direction D2. The internal electrodes 7 and 9 are positioned in a plane approximately orthogonal to the principal surfaces 3a and 3b. The internal electrodes 7 and the internal electrodes 9 oppose each other in the second direction D2. The direction (second direction D2) in which the internal electrodes 7 and the internal electrodes 9 oppose each other is orthogonal to the direction (third direction D3) orthogonal to the principal surfaces 3a and 3b.

As illustrated in FIG. 2, the external electrodes 5 are disposed at both end portions of the element body 3 in the first direction D1. Each of the external electrodes 5 is disposed on the corresponding end surface 3e side of the element body 3. As illustrated in FIGS. 3 to 6, the external electrode 5 includes a plurality of electrode portions 5a, 5b, 5c, and 5e. The electrode portion 5a is disposed on the principal surface 3a and on the ridge portion 3g. The electrode portion 5b is disposed on the ridge portion 3h. The electrode portion 5c is disposed on each side surface 3c and on each ridge portion 3i. The electrode portion 5e is disposed on the corresponding end surface 3e. The external electrode 5 also includes electrode portions disposed on the ridge portion 3j.

The external electrode 5 is formed on the four surfaces, that is, the principal surface 3a, the end surface 3e, and the pair of side surfaces 3c, as well as on the ridge portions 3g, 3h, 3i, and 3j. The electrode portions 5a, 5b, 5c, and 5e adjacent each other are coupled and are electrically connected to each other. In the first embodiment, the external electrode 5 is not intentionally formed on the principal surface 3b. Each electrode portion 5e covers all one ends of the corresponding internal electrodes 7 or 9. The electrode portion 5e is directly connected to the corresponding internal electrodes 7 or 9. The external electrode 5 is electrically connected to the corresponding internal electrodes 7 or 9.

As illustrated in FIGS. 3 to 6, the external electrode 5 includes a first electrode layer E1, a second electrode layer E2, a third electrode layer E3, and a fourth electrode layer E4. The fourth electrode layer E4 is arranged to constitute the outermost layer of the external electrode 5. Each of the electrode portions 5a, 5c, and 5e includes the first electrode layer E1, the second electrode layer E2, the third electrode layer E3, and the fourth electrode layer E4. The electrode portion 5b includes the first electrode layer E1, the third electrode layer E3, and the fourth electrode layer E4.

The first electrode layer E1 included in the electrode portion 5a is disposed on the ridge portion 3g, and is not disposed on the principal surface 3a. The first electrode layer E1 included in the electrode portion 5a is in contact with the entire ridge portion 3g. The principal surface 3a is not covered with the first electrode layer E1, and is exposed from the first electrode layer E1. The second electrode layer E2 included in the electrode portion 5a is disposed on the first electrode layer E1 and on the principal surface 3a. The first electrode layer E1 included in the electrode portion 5a is entirely covered with the second electrode layer E2. The second electrode layer E2 included in the electrode portion 5a is in contact with one part of the principal surface 3a and the entire first electrode layer E1. The one part of the principal surface 3a is, for example, the partial region near the end surface 3e, in the principal surface 3a. That is, the one part of the principal surface 3a is close to the end surface 3e. The electrode portion 5a is four-layered on the ridge portion 3g, and is three-layered on the principal surface 3a.

In a case in which an element is described as being disposed on another element, the element may be directly disposed on the other element or be indirectly disposed on the other element. In a case in which an element is indirectly disposed on another element, an intervening element is present between the element and the other element. In a case in which an element is directly disposed on another element, no intervening element is present between the element and the other element.

In a case in which an element is described as covering another element, the element may directly cover the other element or indirectly cover the other element. In a case in which an element indirectly covers another element, an intervening element is present between the element and the other element. In a case in which an element directly covers another element, no intervening element is present between the element and the other element.

The second electrode layer E2 included in the electrode portion 5a is formed to cover the entire ridge portion 3g and the one part of the principal surface 3a. The one part of the principal surface 3a is, for example, the partial region near the end surface 3e, in the principal surface 3a. That is, the one part of the principal surface 3a is close to the end surface 3e. The second electrode layer E2 included in the electrode portion 5a is formed on the first electrode layer E1 and element body 3 in such a manner that the first electrode layer E1 is positioned between the second electrode layer E2 and the ridge portion 3g. The second electrode layer E2 included in the electrode portion 5a indirectly covers the entire ridge portion 3g. The second electrode layer E2 included in the electrode portion 5a directly covers an entire portion of the first electrode layer E1 formed on the ridge portion 3g. The second electrode layer E2 included in the electrode portion 5a directly covers the one part of the principal surface 3a.

The first electrode layer E1 included in the electrode portion 5b is disposed on the ridge portion 3h, and is not disposed on the principal surface 3b. The first electrode layer E1 included in the electrode portion 5b is in contact with the entire ridge portion 5h. The principal surface 3b is not covered with the first electrode layer E1, and is exposed from the first electrode layer E1. The electrode portion 5b does not include the second electrode layer E2. The principal surface 3b is not covered with the second electrode layer E2, and is exposed from the second electrode layer E2. The second electrode layer E2 is not formed on the principal surface 3b. The electrode portion 5b is three-layered.

The first electrode layer E1 included in the electrode portion 5c is disposed on the ridge portion 3i, and is not disposed on the side surface 3c. The first electrode layer E1 included in the electrode portion 5c is in contact with the entire ridge portion 3i. The side surface 3c is not covered with the first electrode layer E1, and is exposed from the first electrode layer E1. The second electrode layer E2 included in the electrode portion 5c is disposed on the first electrode layer E1 and on the side surface 3c. The second electrode layer E2 included in the electrode portion 5c covers one part of the first electrode layer E1. The second electrode layer E2 included in the electrode portion 5c is in contact with one part of the side surface 3c and the one part of the first electrode layer E1. The second electrode layer E2 included in the electrode portion 5c includes a portion positioned on the side surface 3c.

In a case in which an element is described as being positioned on another element, the element may be directly positioned on the other element or be indirectly positioned on the other element. In a case in which an element is indirectly positioned on another element, an intervening element is present between the element and the other element. In a case in which an element is directly positioned on another element, no intervening element is present between the element and the other element.

The second electrode layer E2 included in the electrode portion 5c is formed to cover one part of the ridge portion 3i and one part of the side surface 3c. The one part of the ridge portion 3i is, for example, a partial region near the principal surface 3a, in the ridge portion 3i. That is, the one part of the ridge portion 3i is close to the principal surface 3a. The one part of the side surface 3c is, for example, a corner region near the principal surface 3a and end surface 3e, in the side surface 3c. That is, the one part of the side surface 3c is close to the principal surface 3a and end surface 3e. The second electrode layer E2 included in the electrode portion 5c is formed on the first electrode layer E1 and element body 3 in such a manner that the first electrode layer E1 is positioned between the second electrode layer E2 and the one part of the ridge portion 3i. The second electrode layer E2 included in the electrode portion 5c indirectly covers the one part of the ridge portion 3i. The second electrode layer E2 included in the electrode portion 5c directly covers one part of the portion of the first electrode layer E1 formed on the ridge portion 3i. The second electrode layer E2 included in the electrode portion 5c directly covers the one part of the side surface 3c.

The electrode portion 5c includes a plurality of regions $5c_1$ and $5c_2$. In the present embodiment, the electrode portion 5c includes only two regions $5c_1$ and $5c_2$. The region $5c_2$ is positioned closer to the principal surface 3a than the region $5c_1$. The region $5c_1$ includes the first electrode layer E1, the third electrode layer E3, and the fourth electrode layer E4. The region $5c_1$ does not include the second electrode layer E2. The region $5c_1$ is three-layered. The region $5c_2$ includes the first electrode layer E1, the second electrode layer E2, the third electrode layer E3, and the fourth electrode layer E4. The regions $5c_2$ is four-layered on the ridge portion 3i, and is three-layered on the side surface 3c. The region $5c_1$ is the region where the first electrode layer E1 is exposed from the second electrode layer E2. The region $5c_2$ is the region where the first electrode layer E1 is covered with the second electrode layer E2.

The first electrode layer E1 included in the electrode portion 5e is disposed on the end surface 3e. The end surface 3e is entirely covered with the first electrode layer E1. The first electrode layer E1 included in the electrode portion 5e is in contact with the entire end surface 3e. The second electrode layer E2 included in the electrode portion 5e is disposed on the first electrode layer E1. In the electrode portion 5e, the first electrode layer E1 is partially covered with the second electrode layer E2. In the electrode portion 5e, the second electrode layer E2 is in contact with one part of the first electrode layer E1. The second electrode layer E2 included in the electrode portion 5e is formed to cover one part of the end surface 3e. The one part of the end surface 3e is, for example, a partial region near the principal surface 3a, in the end surface 3e. That is, the one part of the end surface 3e is close to the principal surface 3a. The second electrode layer E2 included in the electrode portion 5e is formed on the first electrode layer E1 in such a manner that the first electrode layer E1 is positioned between the second electrode layer E2 and the one part of the end surface 3e. The second electrode layer E2 included in the electrode portion 5e indirectly covers the one part of the end surface 3e. The second electrode layer E2 included in the electrode portion 5e directly covers one part of the first electrode layer E1 formed on the end surface 3e. The first electrode layer E1 included in the electrode portion 5e is formed on the end surface 3e to be coupled to the one ends of the corresponding internal electrodes 7 or 9.

The electrode portion 5e includes a plurality of regions $5e_1$ and $5e_2$. In the present embodiment, the electrode portion 5e includes only two regions $5e_1$ and $5e_2$. The region $5e_2$ is positioned closer to the principal surface 3a than the region $5e_1$. The region $5e_1$ includes the first electrode layer E1, the third electrode layer E3, and the fourth electrode layer E4. The region $5e_1$ does not include the second electrode layer E2. The region $5e_1$ is three-layered. The region $5e_2$ includes the first electrode layer E1, the second electrode layer $E2_1$, the third electrode layer E3, and the fourth electrode layer E4. The regions $5e_2$ is four-layered. The region $5e_1$ is the region where the first electrode layer E1 is exposed from the second electrode layer E2. The region $5e_2$ is the region where the first electrode layer E1 is covered with the second electrode layer E2.

The first electrode layer E1 is formed by sintering conductive paste applied onto the surface of the element body 3. The first electrode layer E1 is formed to cover the end surface 3e and the ridge portions 3g, 3h, and 3i. The first electrode layer E1 is formed by sintering a metal component (metal powder) contained in the conductive paste. The first electrode layer E1 includes a sintered metal layer. The first electrode layer E1 includes a sintered metal layer formed on the element body 3. The first electrode layer E1 is not intentionally formed on the pair of principal surfaces 3a and 3b and the pair of side surfaces 3c. The first electrode layer E1 may be unintentionally formed on the principal surfaces 3a and 3b and the side surfaces 3c due to a production error, for example. In the present embodiment, the first electrode layer E1 is a sintered metal layer made of Cu. The first electrode layer E1 may be a sintered metal layer made of Ni. The first electrode layer E1 contains a base metal. The conductive paste contains, for example, powder made of Cu or Ni, a glass component, an organic binder, and an organic solvent.

The second electrode layer E2 is formed by curing conductive resin paste applied onto the first electrode layer E1, the principal surface 3a, and the pair of side surfaces 3c. The second electrode layer E2 includes a conductive resin layer. The second electrode layer E2 is formed over the first electrode layer E1 and the element body 3. In the present embodiment, the second electrode layer E2 covers a partial region of the first electrode layer E1. The partial region of the first electrode layer E1 is, for example, the regions corresponding to the electrode portion 5a, the region $5c_2$ of the electrode portion 5c, and the region $5e_2$ of the electrode portion 5e, in the first electrode layer E1. The second electrode layer E2 directly covers a partial region of the ridge portion 3j. The partial region of the ridge portion 3j is, for example, the partial region near the end surface 3e, in the ridge portion 3j. That is, the partial region of the ridge portion 3j is close to the end surface 3e. The second electrode layer E2 is in contact with the partial region of the ridge portion 3j. The first electrode layer E1 serves as an underlying metal layer for forming the second electrode layer E2. The second electrode layer E2 is a conductive resin layer formed on the first electrode layer E1.

The conductive resin paste contains, for example, a resin, a conductive material, and an organic solvent. The resin is, for example, a thermosetting resin. The conductive material includes, for example, metal powder. The metal powder includes, for example, Ag powder or Cu powder. The thermosetting resin includes, for example, a phenolic resin, an acrylic resin, a silicone resin, an epoxy resin, or a polyimide resin.

The third electrode layer E3 is formed on the second electrode layer E2 and the first electrode layer E1 by plating method. The third electrode layer E3 includes a plating layer. The third electrode layer E3 is formed on a portion of the first electrode layer E1 exposed from the second electrode layer E2. In the present embodiment, the third electrode layer E3 is formed on the first electrode layer E1 and the second electrode layer E2 by Ni plating. The third electrode layer E3 is a Ni plating layer. The third electrode layer E3 may be an Sn plating layer, a Cu plating layer, or an Au plating layer. The third electrode layer E3 contains Ni, Sn, Cu, or Au.

The fourth electrode layer E4 is formed on the third electrode layer E3 by plating method. The fourth electrode layer E4 includes a plating layer. In the present embodiment, the fourth electrode layer E4 is formed on the third electrode layer E3 by Sn plating. The fourth electrode layer E4 is an Sn plating layer. The fourth electrode layer E4 may be a Cu plating layer or an Au plating layer. The fourth electrode layer E4 contains Sn, Cu, or Au. The third electrode layer E3 and the fourth electrode layer E4 constitute a plating layer formed on the second electrode layer E2. In the present embodiment, the plating layer formed on the second electrode layer E2 is two-layered.

The first electrode layer E1 included in the electrode portion 5a, the first electrode layer E1 included in the electrode portion 5b, the first electrode layer E1 included in the electrode portion 5c, and the first electrode layer E1 included in the electrode portion 5e are integrally formed. The second electrode layer E2 included in the electrode portion 5a, the second electrode layer E2 included in the electrode portion 5c, and the second electrode layer E2 included in the electrode portion 5e are integrally formed. The third electrode layer E3 included in the electrode portion 5a, the third electrode layer E3 included in the electrode portion 5b, the third electrode layer E3 included in the electrode portion 5c, and the third electrode layer E3 included in the electrode portion 5e are integrally formed. The fourth electrode layer E4 included in the electrode portion 5a, the fourth electrode layer E4 included in the electrode portion 5b, the fourth electrode layer E4 included in the electrode portion 5c, and the fourth electrode layer E4 included in the electrode portion 5e are integrally formed.

The first electrode layer E1 (first electrode layer E1 included in the electrode portion 5e) is formed on the end surface 3e to be connected to the corresponding internal electrodes 7 and 9. The first electrode layer E1 covers the entire end surface 3e, the entire ridge portion 3g, the entire ridge portion 3h, and the entire ridge portion 3i. The second electrode layer E2 (second electrode layer E2 included in the electrode portions 5a, 5c, and 5e) continuously covers one part of the principal surface 3a, one part of the end surface 3e, and one part of each of the pair of side surfaces 3c. The second electrode layer E2 (second electrode layer E2 included in the electrode portions 5a, 5c, and 5e) covers the entire ridge portion 3g, one part of the ridge portion 3i, and one part of the ridge portion 3j. The second electrode layer E2 includes a plurality of portions each corresponding to the one part of the principal surface 3a, the one part of the end surface 3e, the one part of each of the pair of side surfaces 3c, the entire ridge portion 3g, the one part of the ridge portion 3i, and the one part of the ridge portion 3j. The first electrode layer E1 (first electrode layer E1 included in the electrode portion 5e) is directly connected to the corresponding internal electrodes 7 and 9.

The first electrode layer E1 (first electrode layer E1 included in the electrode portions 5a, 5b, 5c, and 5e) includes a region covered with the second electrode layer E2 (second electrode layer E2 included in the electrode portions 5a, 5c, and 5e), and a region not covered with the second electrode layer E2 (second electrode layer E2 included in the electrode portions 5a, 5c, and 5e). The region not covered with the second electrode layer E2 is a region exposed from the second electrode layer layer E2. The third electrode layer E3 and the fourth electrode layer E4 cover the region not covered with the second electrode layer E2 in the first electrode layer E1, and the second electrode layer E2.

Figure 4:
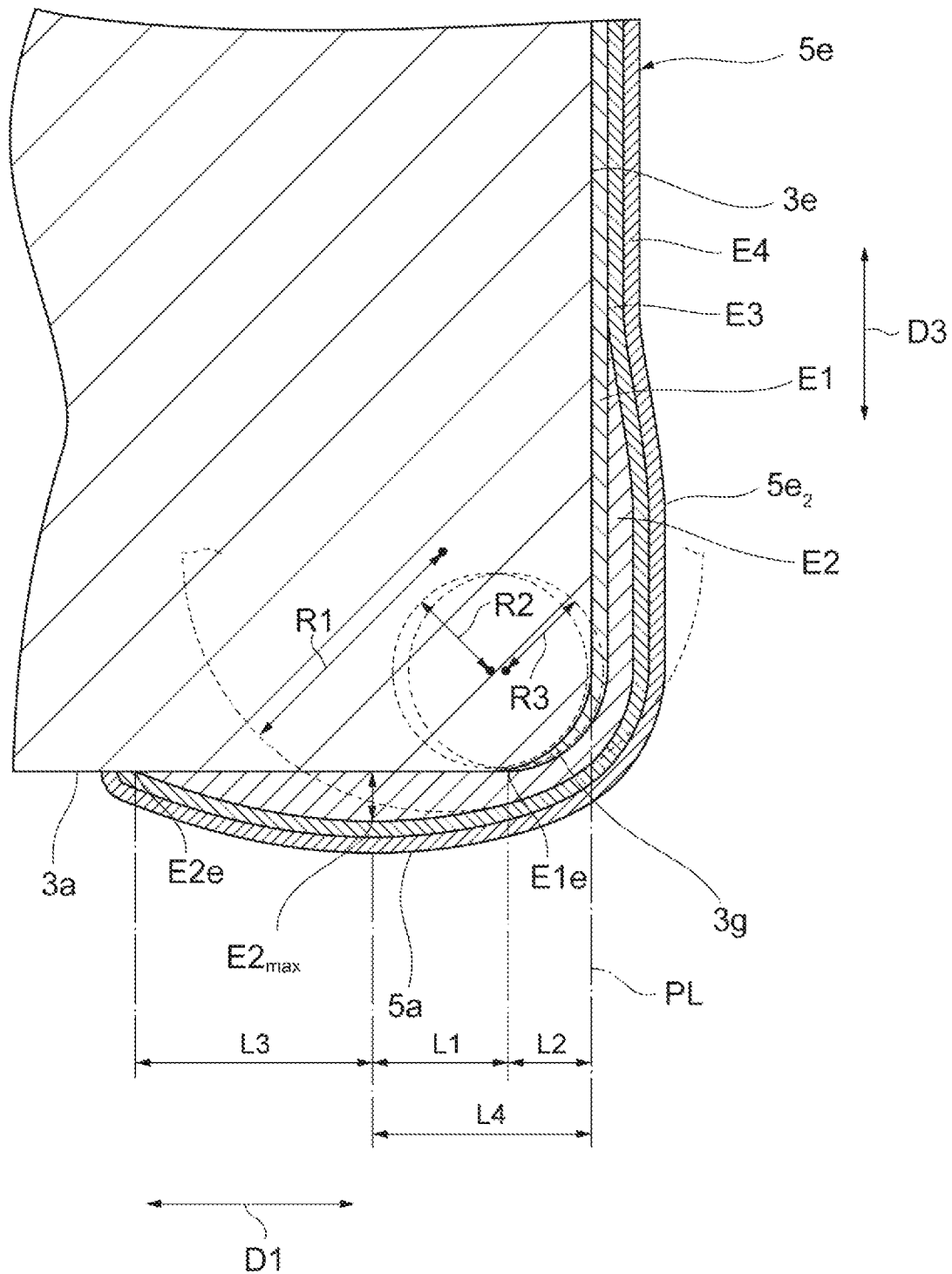
FIG. 4 is a view illustrating the cross-sectional configuration of the multilayer capacitor according to the first embodiment.
Figure 5:
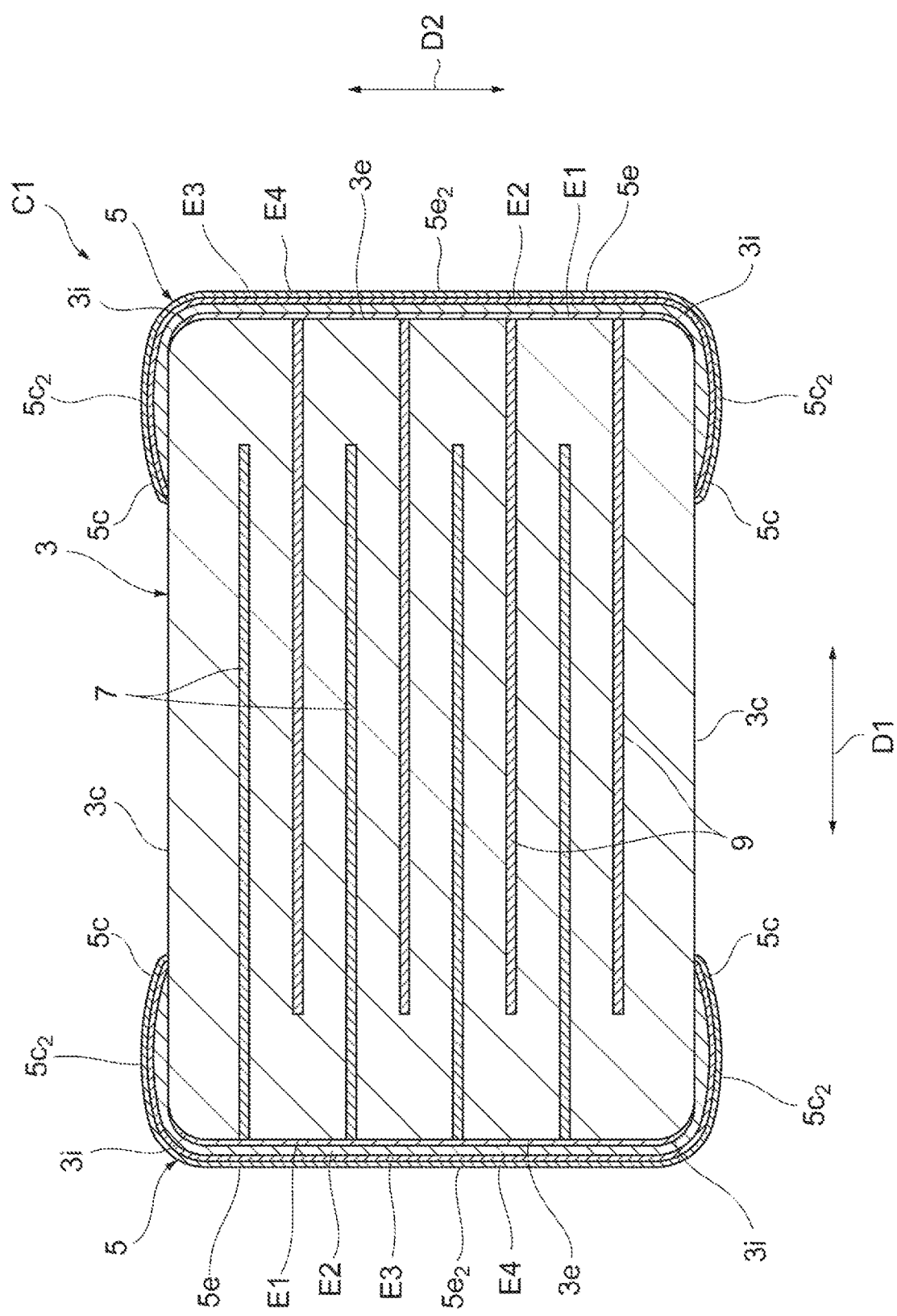
FIG. 5 is a view illustrating the cross-sectional configuration of the multilayer capacitor according to the first embodiment.

As illustrated in FIG. 4, the second electrode layer E2 included in the electrode portion 5a has a maximum thickness position $E2_{max}$. The maximum thickness position $E2_{max}$ has a largest thickness in the second electrode layer E2 included in the electrode portion 5a. In the first direction D1, an end edge E1e of the first electrode layer E1 is positioned closer to the end surface 3e than the maximum thickness position $E2_{max}$. The second electrode layer E2 included in the electrode portion 5a includes a first portion positioned on the principal surface 3a, and a second portion positioned on the ridge portion 3g (the first electrode layer E1). In the present embodiment, the first portion is in contact with the principal surface 3a, and the second portion is in contact with the first electrode layer E1. In the present embodiment, the maximum thickness position $E2_{max}$ is present in the first portion of the second electrode layer E2. In the first portion, the thickness of the second electrode layer E2 included in the electrode portion 5a is a thickness in the direction orthogonal to the principal surface 3a. In the second portion, the thickness of the second electrode layer E2 included in the electrode portion 5a is a thickness in a normal direction of the ridge portion 3g (curved surface).

A thickness in the first portion of the second electrode layer E2 gradually decreases from the maximum thickness position $E2_{max}$ to the second portion. The thickness in the first portion of the second electrode layer E2 gradually decreases from the maximum thickness position $E2_{max}$ to the end edge E2e of the second electrode layer E2. The thickness in the first portion of the second electrode layer E2 is a thickness in the third direction D3 (direction orthogonal to the principal surface 3a). A thickness of the maximum thickness position $E2_{max}$, that is, a maximum thickness of the second electrode layer E2 included in the electrode portion 5a is equal to or larger than 30 µm. In the present embodiment, the maximum thickness of the second electrode layer E2 included in the electrode portion 5a is 100 µm.

A surface of the second electrode layer E2 curves as the result of changes in the thickness in the second electrode layer E2 of the electrode portion 5a. A surface of the first electrode layer E1 curves at a portion positioned on the ridge portion 3g. In a cross-section orthogonal to the end surface 3e and the principal surface 3a, a radius of curvature R1 of the surface of the second electrode layer E2 is larger than a radius of curvature R2 of the ridge portion 3g (curved surface), and larger than a radius of curvature R3 of the surface of the first electrode layer E1. The radius of curvature R1 is, for example, 100 to 700 µm. In the present embodiment, the radius of curvature R1 is 350 µm. The radius of curvature R2 is, for example, 50 to 400 µm. In the present embodiment, the radius of curvature R2 is 150 µm. The radius of curvature R3 is, for example, 75 to 500 µm. In the present embodiment, the radius of curvature R3 is 200 µm. The cross-section orthogonal to the end surface 3e and the principal surface 3a is, for example, a cross-section of the element body 3 and external electrode 5 taken along a plane that is parallel to the pair of side surface 3c and is positioned at approximately an equal distance from the pair of side surface 3c.

Figure 6:
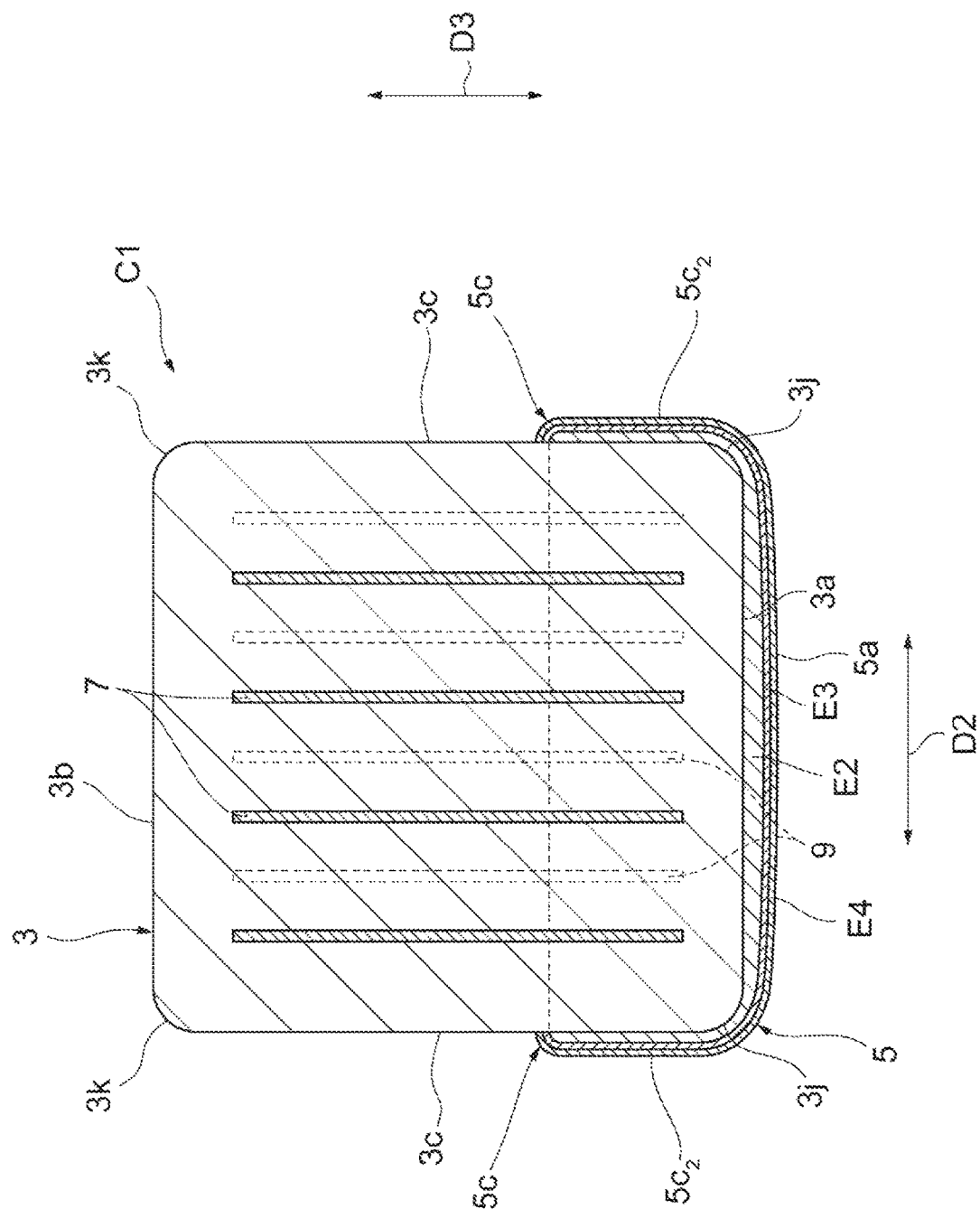
FIG. 6 is a view illustrating the cross-sectional configuration of the multilayer capacitor according to the first embodiment.

As illustrated in FIG. 6, the thickness of the first portion of the second electrode layer E2 is larger at the center in the second direction D2 than at the end in the second direction D2, when viewed from the first direction D1. In the present embodiment, the thickness of the first portion of the second electrode layer E2 is largest at the center in the second direction D2, and gradually decreases to the end in the second direction D2. The maximum thickness of the second electrode layer E2 included in the electrode portion 5a is larger than a maximum thickness of the second electrode layer E2 included in the region $5c_2$. The thickness of the second electrode layer E2 included in the region $5c_2$ is a thickness in the second direction D2 (direction orthogonal to the side surface 3c). The second electrode layer E2 included in the region $5c_2$ includes a portion positioned on the side surface 3c. The maximum thickness of the second electrode layer E2 included in the region $5c_2$ is equal to or larger than 5 µm. In the present embodiment, the maximum thickness of the second electrode layer E2 included in the region $5c_2$ is 15 µm.

As illustrated in FIG. 4, a length L1, in the first direction D1, from the end edge E1e of the first electrode layer E1 to the maximum thickness position $E2_m$ is larger than a length L2, in the first direction D1, from a reference plane PL to the end edge E1e of the first electrode layer E1. The reference plane PL is defined as a plane that includes the end surface 3e. The length L1 is, for example, 100 to 400 µm. In the present embodiment, the length L1 is 250 µm. The length L2 is, for example, 75 to 300 µm. In the present embodiment, the length L2 is 200 µm.

A length L3, in the first direction D1, from the maximum thickness position $E2_{max}$ to the end edge E2e of the second electrode layer E2 is larger than a length L4, in the first direction D1, from the reference plane PL to the maximum thickness position $E2_{max}$. The length L3 is larger than the length L1. The length L3 is, for example, 175 to 700 µm. In the present embodiment, the length L3 is 500 µm. The length L4 is the sum of the length L1 and the length L2. In the present embodiment, the length L4 is 450 µm.

As illustrated in FIG. 7, when viewed from the third direction D3, the first electrode layer E1 (first electrode layer E1 included in the electrode portion 5a) is entirely covered with the second electrode layer E2. When viewed from the third direction D3, the first electrode layer E1 (first electrode layer E1 included in the electrode portion 5a) is not exposed from the second electrode layer E2.

As illustrated in FIG. 8, when viewed from the second direction D2, a first end region near the principal surface 3a of the first electrode layer E1 is covered with the second electrode layer E2. The first end region of the first electrode layer E1 includes the first electrode layer E1 included in the region $5c_2$. The first end region of the first electrode layer E1 is close to the principal surface 3a. When viewed from the second direction D2, an end edge $E2e_c$ of the second electrode layer E2 crosses an end edge $E1e_c$ of the first electrode layer E1. When viewed from the second direction D2, a second end region near the principal surface 3b of the first electrode layer E1 is exposed from the second electrode layer E2. The second end region of the first electrode layer E1 includes the first electrode layer E1 included in the region $5c_1$. The second end region of the first electrode layer E1 is close to the principal surface 3b. The second electrode layer E2 positioned on the side surface 3c opposes the internal electrode 7 or 9 having polarity different from that of the second electrode layer E2, in the second direction D2.

As illustrated in FIG. 9, when viewed from the first direction D1, a third end region near the principal surface 3a of the first electrode layer E1 is covered with the second electrode layer E2. The third end region of the first electrode layer E1 includes the first electrode layer E1 included in the region $5e_2$. The third end region of the first electrode layer E1 is close to the principal surface 3a. When viewed from the first direction D1, an end edge of the second electrode layer E2 is positioned on the first electrode layer E1. When viewed from the first direction D1, a fourth end region near the principal surface 3b of the first electrode layer E1 is exposed from the second electrode layer E2. The fourth end region of the first electrode layer E1 includes the first electrode layer E1 included in the region $5e_1$. The fourth end region of the first electrode layer E1 is close to the principal surface 3b. When viewed from the first direction D1, an area of the second electrode layer E2 positioned on the end surface 3e and ridge portion 3g is smaller than an area of the first electrode layer E1 positioned on the end surface 3e and ridge portion 3g.

As illustrated in FIG. 9, one end of each of the internal electrodes 7 and 9 includes a first region overlapping with the second electrode layer E2 and a second region not overlapping with the second electrode layer E2, when viewed from the first direction D1. The first region is positioned closer to the principal surface 3a in the third direction D3 than the second region. The first electrode layer E1 included in the region $5e_2$ is connected to the first region. The first electrode layer E1 included in the region $5e_1$ is connected to the second region.

In the present embodiment, the second electrode layer E2 continuously covers only the one part of the principal surface 3a, only the one part of the end surface 3e, and only the one part of each of the pair of side surfaces 3c. The second electrode layer E2 covers the entire ridge portion 3g, only the one part of the ridge portion 3i, and only the one part of the ridge portion 3j. The portion of the first electrode layer E1 covering the ridge portion 3i is partially exposed from the second electrode layer E2. For example, the first electrode layer E1 included in the region $5c_1$ is exposed from the second electrode layer E2. The first electrode layer E1 is formed on the end surface 3e to be connected to the first region of the corresponding internal electrode 7 or 9. In the present embodiment, the first electrode layer E1 is formed on the end surface 3e to be also connected to the second region of the corresponding internal electrode 7 or 9.

As illustrated in FIG. 2, a width of the region $5c_2$ in the first direction D1 decreases with an increase in distance from the principal surface 3a. The width of the region $5c_2$ in the first direction D1 decreases with an increase in distance from the electrode portion 5a. A width of the region $5c_2$ in the third direction D3 decreases with an increase in distance from the end surface 3e. The width of the region $5c_2$ in the third direction D3 decreases with an increase in distance from the electrode portion 5e. In the present embodiment, when viewed from the second direction D2, an end edge of the region $5c_2$ has an approximately arc shape. When viewed from the second direction D2, the region $5c_2$ has an approximately fan shape. As illustrated in FIG. 8, in the present embodiment, a width of the second electrode layer E2 when viewed from the second direction D2 decreases with an increase in distance from the principal surface 3a. When viewed from the second direction D2, a length of the second electrode layer E2 in the third direction D3 decreases with an increase in distance in the first direction D1 from the end surface 3e. When viewed from the second direction D2, a length of the portion of the second electrode layer E2 positioned on the side surface 3c in the third direction D3 decreases with an increase in distance in the first direction D1 from an end of the element body 3. As illustrated in FIG. 8, when viewed from the second direction D2, the end edge $E2e_c$ of the second electrode layer E2 has an approximately arc shape.

In a case in which the multilayer capacitor C1 is solder-mounted on the electronic device, external force applied onto the multilayer capacitor C1 from the electronic device may act as stress on the element body 3. In this case, a crack may occur in the element body 3. The external force acts on the element body 3 from a solder fillet formed at the solder-mounting, through the external electrode 5. The stress tends to concentrate on the end edge E1e of the first electrode layer E1. Therefore, a crack may occur in the element body 3 with the end edge E1e of the first electrode layer E1 as a starting point. In the multilayer capacitor C1, the end edge E1e of the first electrode layer E1 is positioned closer to the end surface 3e than the maximum thickness position $E2_{max}$ of the second electrode layer E2. Therefore, the second electrode layer E2 reliably covers the end edge E1e of the first electrode layer E1. Even in a case in which the external force acts on the multilayer capacitor C1 from the solder fillet, the stress tends not to concentrate on the end edge E1e of the first electrode layer E1. The end edge E1e of the first electrode layer E1 tends not to serve as the starting point of a crack. Consequently, the multilayer capacitor C1 suppresses occurrence of a crack in the element body 3.

In the multilayer capacitor C1, the thickness of the second electrode layer E2 included in the electrode portion 5a gradually decreases from the maximum thickness position $E2_{max}$ to the second portion of the second electrode layer E2. In the multilayer capacitor C1, a surface profile of the external electrode 5 varies smoothly, as compared with an electronic component in which a thickness of the second electrode layer E2 is constant. Therefore, the In the multilayer capacitor C1 distributes the external force applied onto the external electrode 5, and thus reduces the stress concentrating on the end edge E1e of the first electrode layer E1. Consequently, the multilayer capacitor C1 further suppresses the occurrence of a crack in the element body 3.

In the multilayer capacitor C1, the length L1, in the first direction D1, from the end edge E1e of the first electrode layer E1 to the maximum thickness position $E2_{max}$ is larger than the length L2, in the first direction D1, from the reference plane PL to the end edge E1e of the first electrode layer E1. Therefore, the multilayer capacitor C1 further reduces the stress concentrating on the end edge E1e of the first electrode layer E1. Consequently, the multilayer capacitor C1 further suppresses the occurrence of a crack in the element body 3.

In the multilayer capacitor C1, the first electrode layer E1 includes no portion positioned on the principal surface 3a. In this case, the end edge E1e of the first electrode layer E1 is not positioned on the principal surface 3a. In an electronic component in which the end edge E1e of the first electrode layer E1 is positioned on the principal surface 3a, the stress tends to concentrate on the end edge E1e of the first electrode layer E1, as compared with a configuration in which the end edge E1e of the first electrode layer E1 is not positioned on the principal surface 3a. Therefore, in the multilayer capacitor C1, the stress tends not to concentrate on the end edge E1e of the first electrode layer E1. Consequently, the multilayer capacitor C1 further suppresses the occurrence of a crack in the element body 3.

In the multilayer capacitor C1, the length L3, in the first direction D1, from the maximum thickness position $E2_{max}$ to the end edge E2e of the second electrode layer E2 is larger than the length L4, in the first direction D1, from the reference plane PL to the maximum thickness position $E2_{max}$. In a case in which the external force acts on the end edge E2e of the second electrode layer E2, the second electrode layer E2 may peel off from the element body 3 (principal surface 3a) with the end edge E2e as a starting point. In the multilayer capacitor C1 in which the length L3 is larger than the length L4, bonding strength between the second electrode layer E2 and the element body 3 (principal surface 3a) is large, as compared with an electronic component in which the length L3 is equal to or smaller than the length L4. Therefore, in the multilayer capacitor C1, the second electrode layer E2 tends not to peel off from the element body 3 (principal surface 3a).

In the multilayer capacitor C1, the length L3 is larger than the length L1. In this case, volume of the portion positioned on the principal surface 3a, in the second electrode layer E2 is large, as compared with an electronic component in which the length L3 is equal to or smaller than the length L1. Therefore, the multilayer capacitor C1 further reduces the stress concentrating on the end edge E1e of the first electrode layer E1. Consequently, the multilayer capacitor C1 further suppresses the occurrence of a crack in the element body 3.

In the multilayer capacitor C1, the thickness of the second electrode layer E2 included in the electrode portion 5a gradually decreases from the maximum thickness position $E2_{max}$ to the end edge E2e of the second electrode layer E2. In the multilayer capacitor C1, the external force tends not to act on the end edge E2e of the second electrode layer E2, as compared with an electronic component in which a thickness of the second electrode layer E2 is constant.

Therefore, in the multilayer capacitor C1, the second electrode layer E2 tends not to peel off from the element body 3 (principal surface 3a).

In the multilayer capacitor C1, when viewed from the first direction D1, the thickness of the first portion of the second electrode layer E2 is larger at the center in the second direction D2 than at the end in the second direction D2. As described above, the first portion of the second electrode layer E2 is positioned on the principal surface 3a. In the multilayer capacitor C1, the surface profile of the external electrode 5 varies more smoothly, as compared with an electronic component in which a thickness of the first portion of the second electrode layer E2 is constant. Therefore, the multilayer capacitor C1 further distributes the external force applied onto the external electrode 5, and thus further reduces the stress concentrating on the end edge E1e of the first electrode layer E1.

In the multilayer capacitor C1, the maximum thickness of the second electrode layer E2 included in the electrode portion 5a is larger than the maximum thickness of the second electrode layer E2 included in the region $5c_2$. As described above, the second electrode layer E2 included in the region $5c_2$ includes the portion positioned on the side surface 3c. In the present embodiment, the maximum thickness of the first portion is larger than the maximum thickness of the portion positioned on the side surface 3c. The multilayer capacitor C1 reduces the stress concentrating on the end edge E1e of the first electrode layer E1, as compared with an electronic component in which the maximum thickness of the first portion is equal to or smaller than the maximum thickness of the portion positioned on the side surface 3c. Therefore, the multilayer capacitor C1 further suppresses the occurrence of a crack in the element body 3.

In the multilayer capacitor C1, the maximum thickness of the second electrode layer E2 included in the electrode portion 5a is equal to or larger than 30 μm. In the present embodiment, the maximum thickness of the first portion is equal to or larger than 30 μm. The multilayer capacitor C1 reduces the stress concentrating on the end edge E1e of the first electrode layer E1, as compared with an electronic component in which the maximum thickness of the first portion is smaller than 30 μm. Therefore, the multilayer capacitor C1 further suppresses the occurrence of a crack in the element body 3.

In the multilayer capacitor C1, the radius of curvature R1 of the surface of the second electrode layer E2 is larger than the radius of curvature R2 of the ridge potion 3g (curved surface), and larger than the radius of curvature R3 of the surface of the first electrode layer E1, in the cross-section orthogonal to the end surface 3e and the principal surface 3a. In this case, the surface profile of the external electrode 5 varies more smoothly. Therefore, the multilayer capacitor C1 further distributes the external force applied onto the external electrode 5, and thus further reduces the stress concentrating on the end edge E1e of the first electrode layer E1.

A region between the element body 3 and the second electrode layer E2 may include a path through which moisture infiltrates. In a case in which moisture infiltrates from the region between the element body 3 and the second electrode layer E2, durability of the multilayer capacitor C1 decreases. In the multilayer capacitor C1, the second electrode layer E2 continuously covers the one part of the principal surface 3a, the one part of the end surface 3e, and the one part of each of the pair of side surfaces 3c. Therefore, the multilayer capacitor C1 includes few paths through which moisture infiltrates, as compared with an electronic component in which the second electrode layer E2 covers the entire end surface 3e, one part of each of the principal surfaces 3a and 3b, and one part of each of the pair of side surfaces 3c. Consequently, the multilayer capacitor C1 improves moisture resistance reliability.

Figure 10:
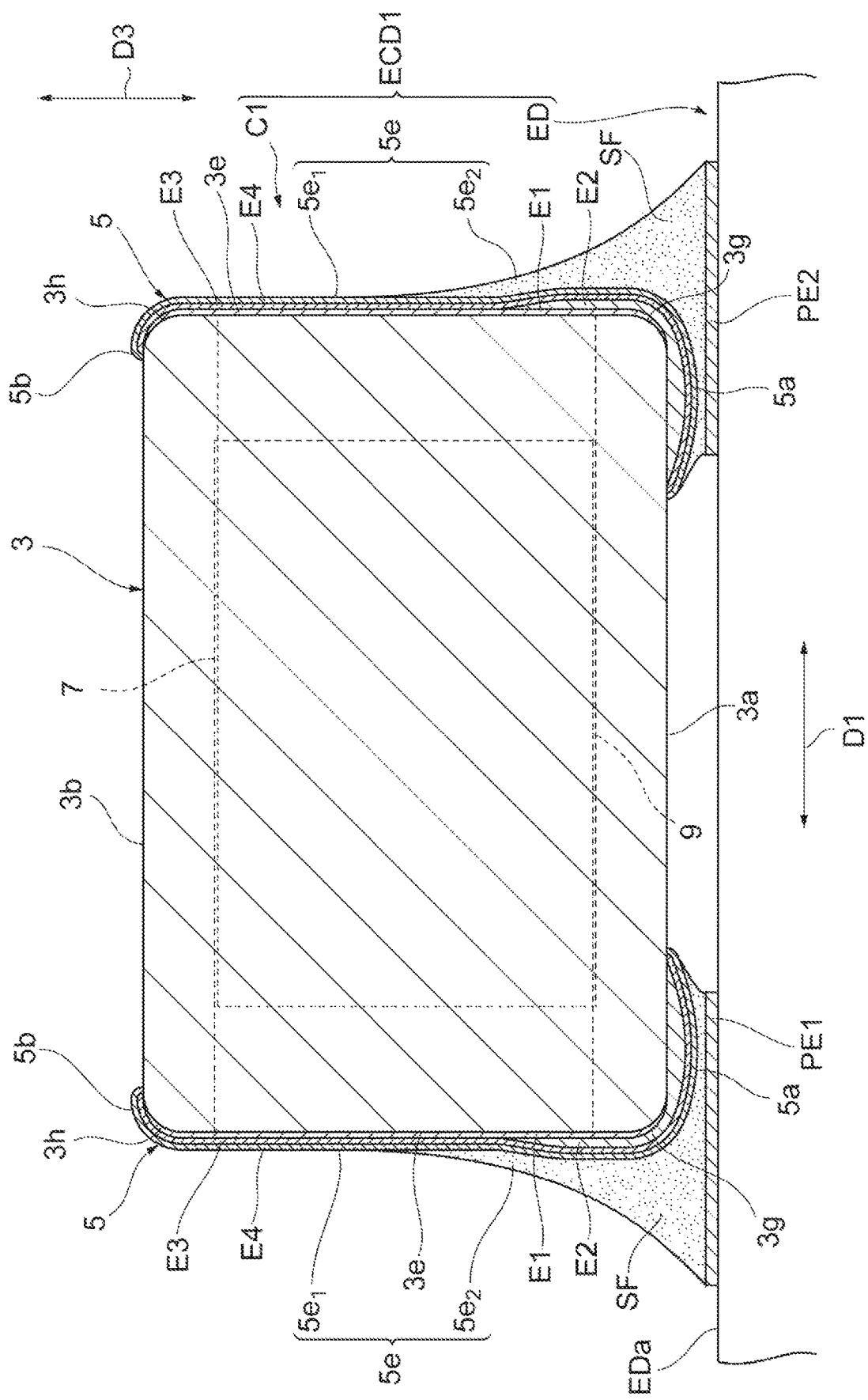
FIG. 10 is a view illustrating a mounting structure of the multilayer capacitor according to the first embodiment.

Next, a mounted structure of the multilayer capacitor C1 will be described with reference to FIG. 10. FIG. 10 is a view illustrating a mounted structure of a multilayer capacitor according to the embodiment.

As illustrated in FIG. 10, an electronic component device ECD1 includes the multilayer capacitor C1 and an electronic device ED. The electronic device ED includes, for example, a circuit board or an electronic component. The multilayer capacitor C1 is solder-mounted on the electronic device ED. The electronic device ED includes a principal surface EDa and a plurality of pad electrodes PE1 and PE2. In the present embodiment, the electronic device ED includes two pad electrodes PE1 and PE2. Each of the pad electrodes PE1 and PE2 is disposed on the principal surface EDa. The two pad electrodes PE1 and PE2 are separated from each other. The multilayer capacitor C1 is disposed on the electronic device ED in such a manner that the principal surface 3a and the principal surface EDa oppose each other. As described above, the principal surface 3a is arranged to constitute a mounting surface.

When the multilayer capacitor C1 is solder-mounted, molten solder wets to the external electrodes 5 (fourth electrode layer E4). Solder fillets SF are formed on the external electrodes 5 by solidification of the wet solder. The external electrodes 5 and the pad electrodes PE1 and PE2 corresponding to each other are coupled via the solder fillets SF.

The solder fillet SF is formed on the regions $5e_1$ and $5e_2$ included in the electrode portion 5e. In addition to the region $5e_2$, the region $5e_1$ that does not include the second electrode layer E2 is also coupled to the corresponding pad electrode PE1 or PE2 via the solder fillet SF. When viewed from the first direction D1, the solder fillet SF overlaps the region $5e_1$ included in the electrode portion 5e. When viewed from the first direction D1, the solder fillet SF overlaps the first electrode layer E1 included in the region $5e_1$. Although illustration is omitted, the solder fillets SF are also formed on the regions $5c_1$ and $5c_2$ included in the electrode portion 5c. A height of the solder fillet SF in the third direction D3 is larger than a height of the second electrode layer E2 in the third direction D3. The solder fillet SF extends in the third direction D3 to be closer to the principal surface 3b than the end edge $E2e_1$ of the second electrode layer E2.

As described above, the electronic component device ECD1 suppresses occurrence of a crack in the element body 3, and improves moisture resistance reliability. In the electronic component device ECD1, when viewed from the first direction D1, the solder fillet SF overlaps the region $5e_1$ included in the electrode portion 5e. Therefore, even in a case in which the external electrode 5 includes the second electrode layer E2, the electronic component device ECD1 suppresses an increase in equivalent series resistance (ESR).

Second Embodiment

Figure 11:
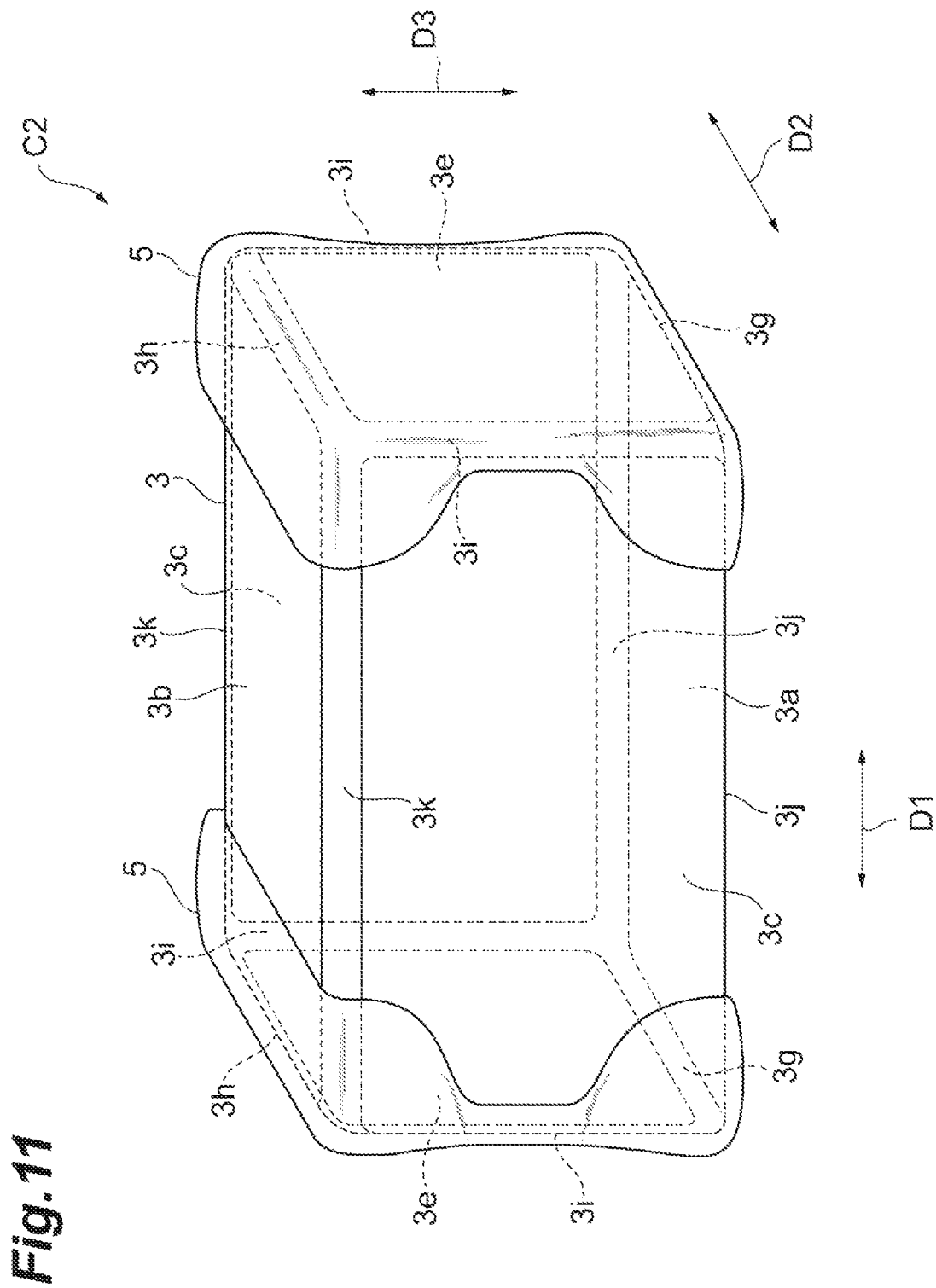
FIG. 11 is a perspective view of a multilayer capacitor according to a second embodiment.
Figure 12:
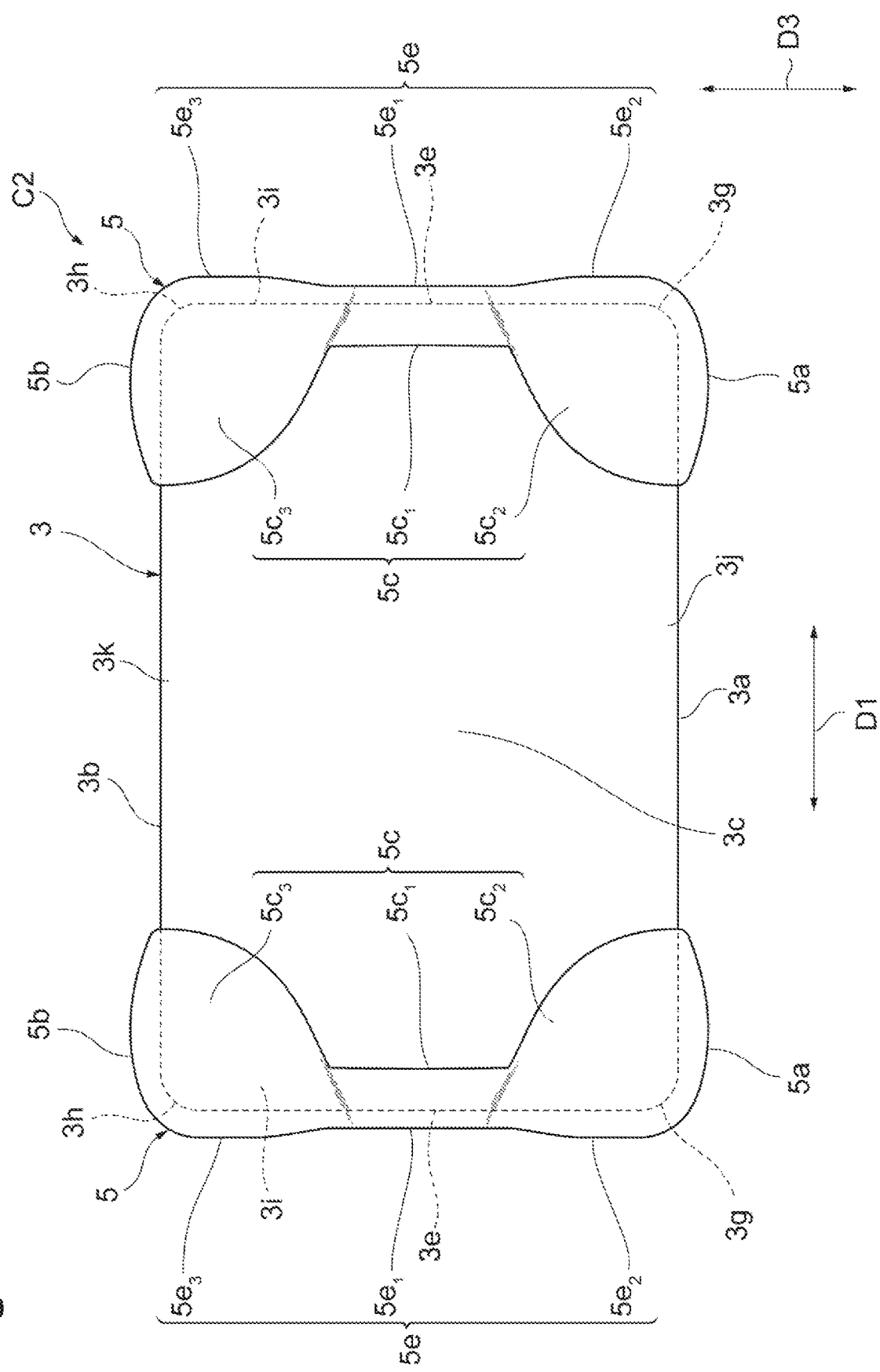
FIG. 12 is a side view of the multilayer capacitor according to the second embodiment.
Figure 13:
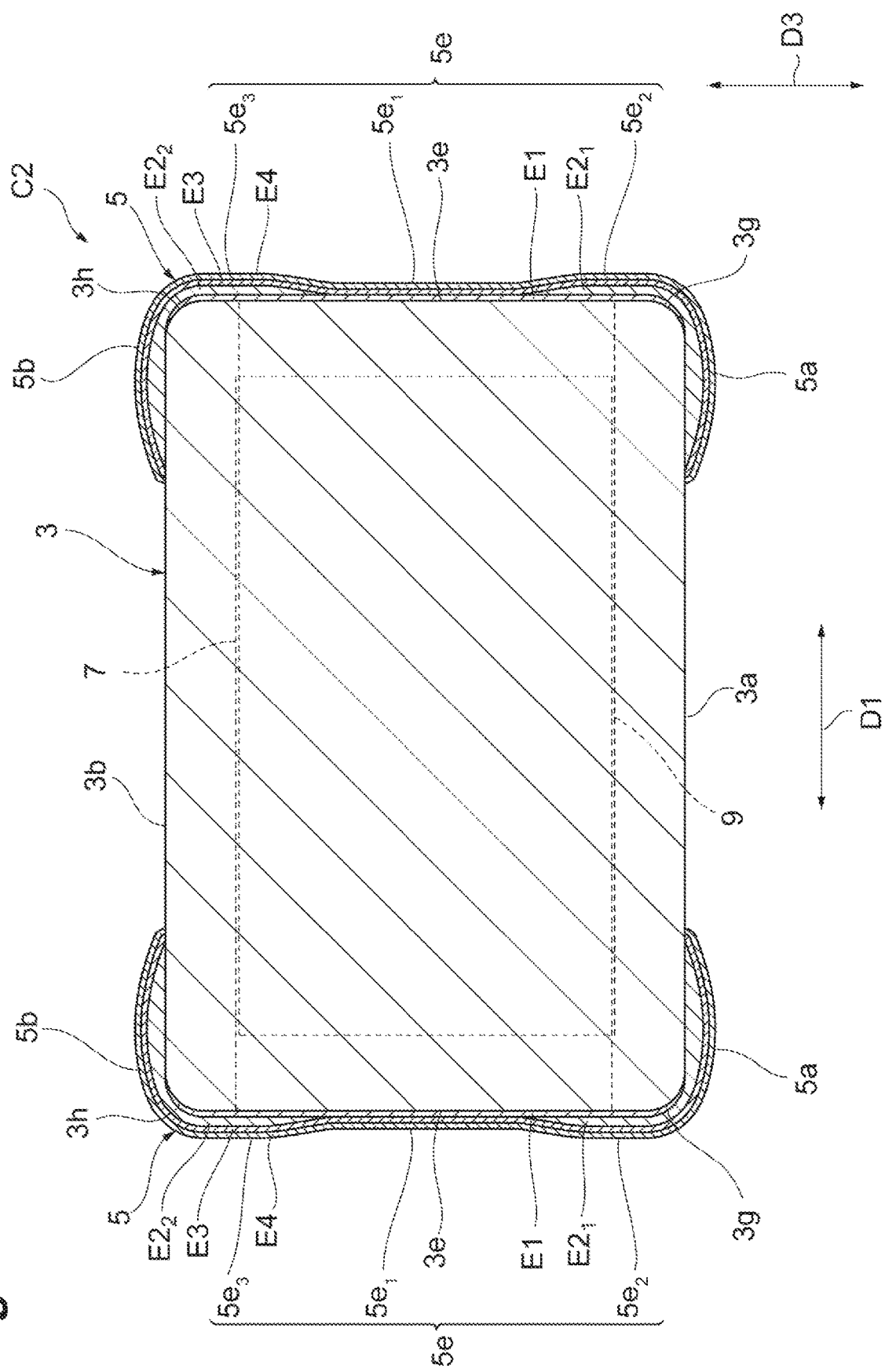
FIG. 13 is a view illustrating a cross-sectional configuration of the multilayer capacitor according to the second embodiment.
Figure 14:
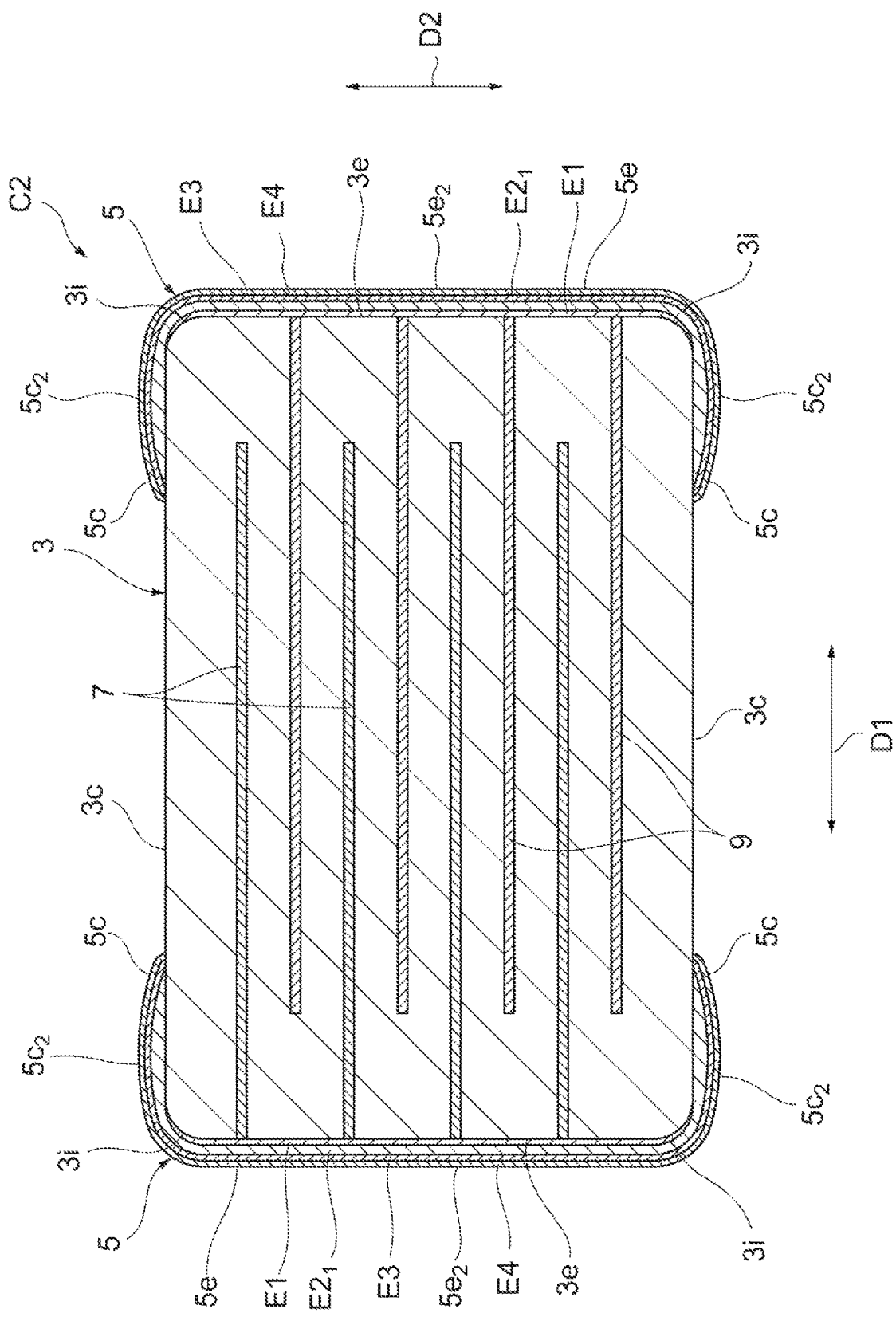
FIG. 14 is a view illustrating the cross-sectional configuration of the multilayer capacitor according to the second embodiment.
Figure 15:
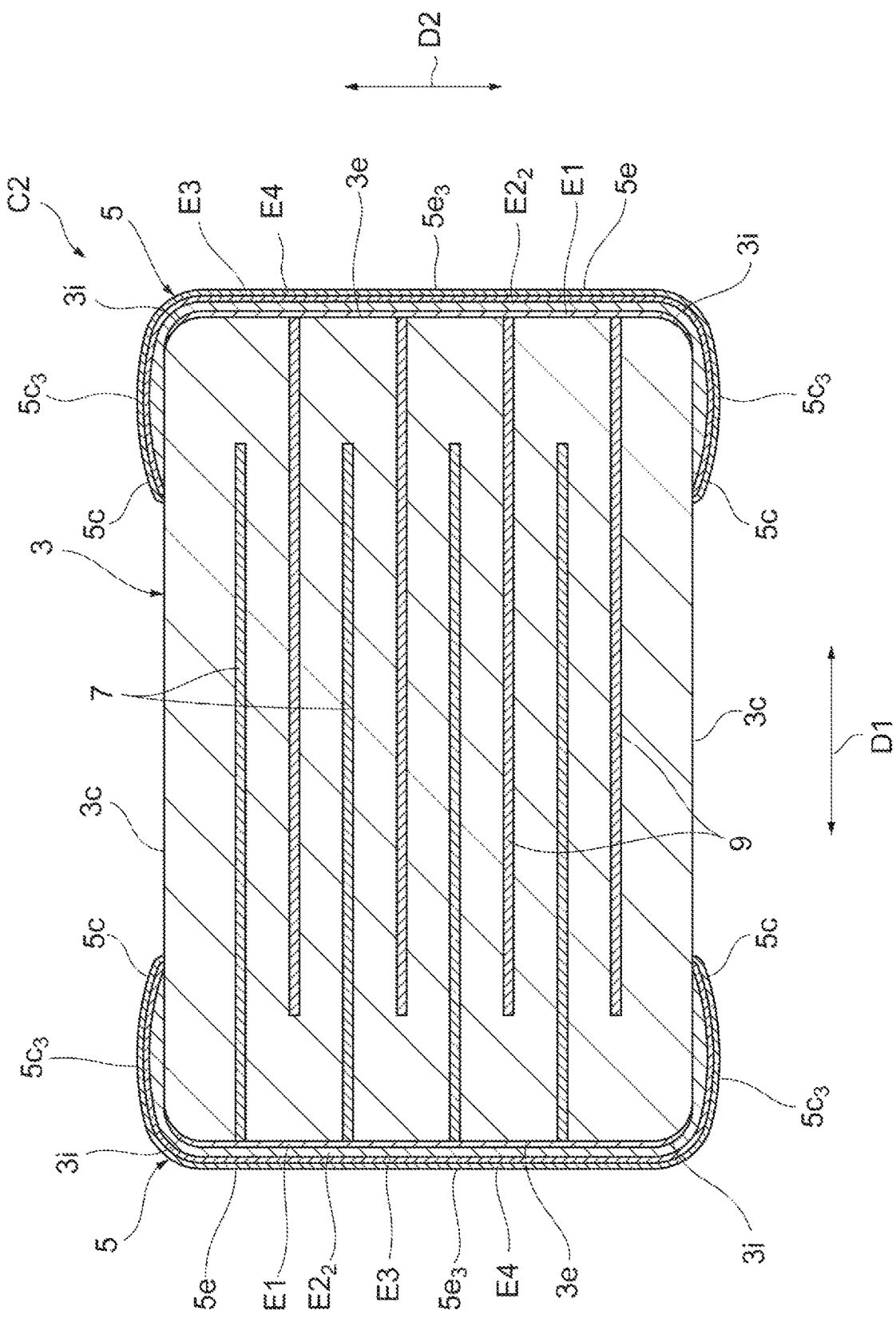
FIG. 15 is a view illustrating the cross-sectional configuration of the multilayer capacitor according to the second embodiment.
Figure 19:
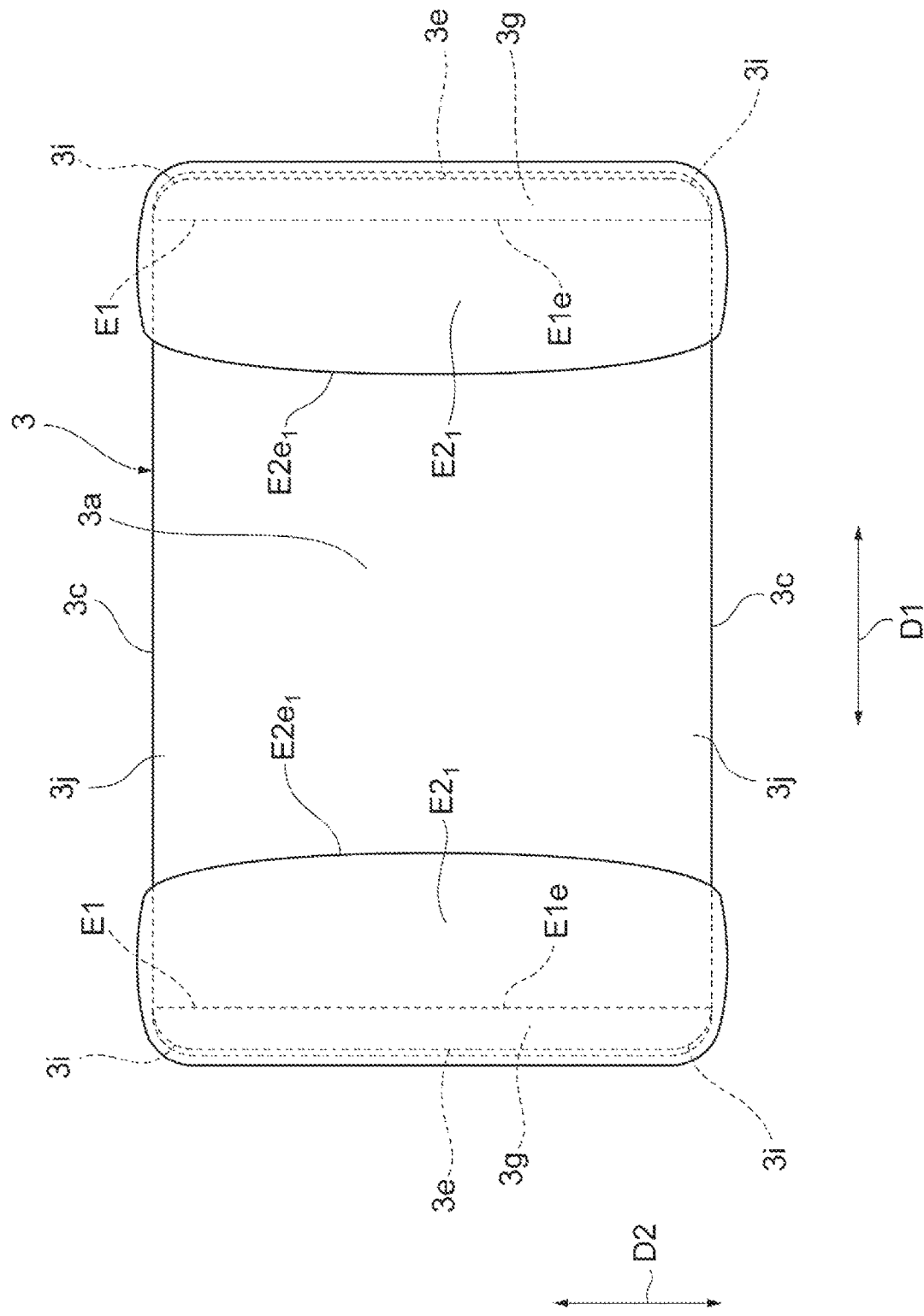
FIG. 19 is a plan view illustrating an element body, a first electrode layer, and a second electrode layer.
Figure 20:
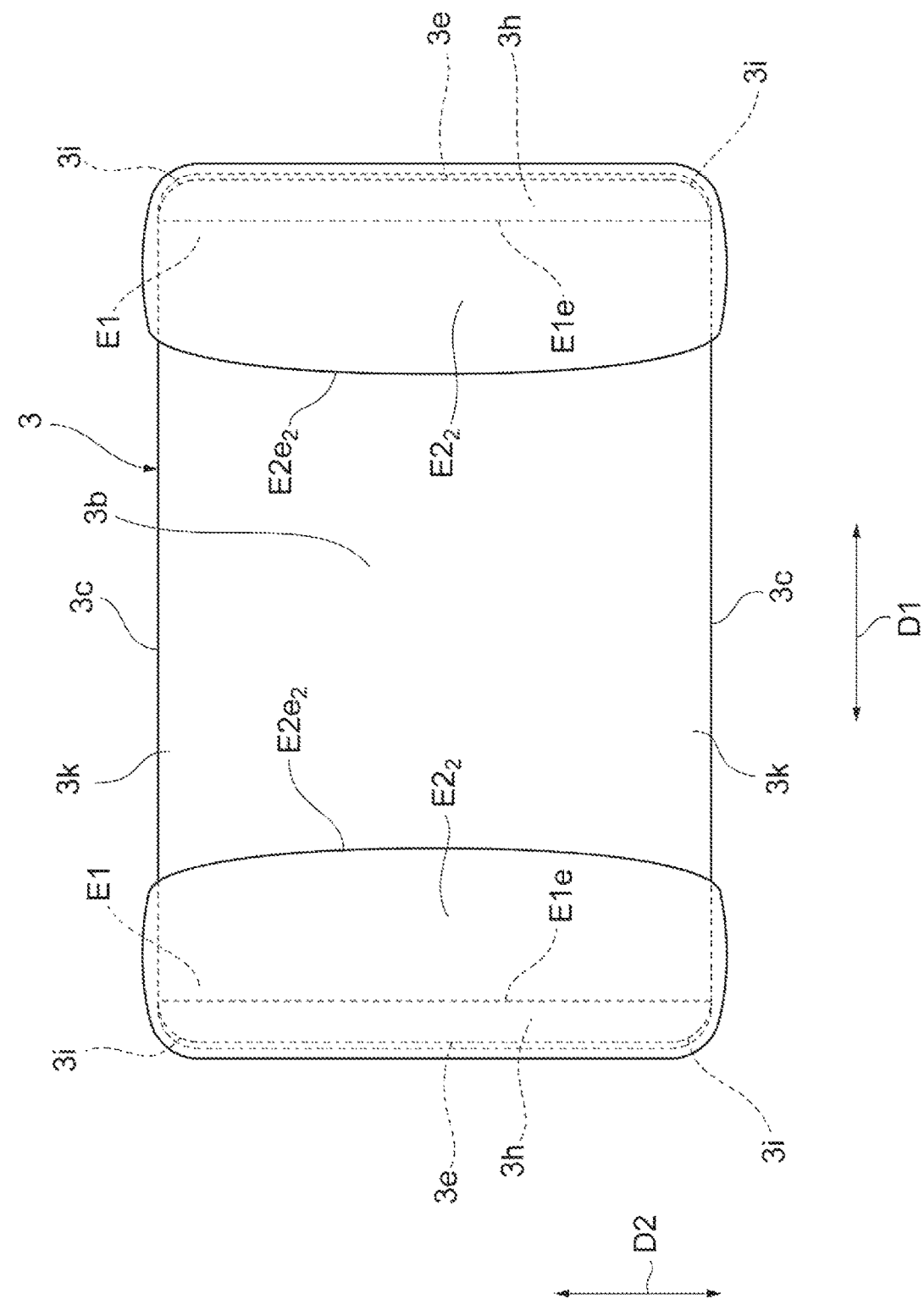
FIG. 20 is a plan view illustrating the element body, the first electrode layer, and the second electrode layer.
Figure 21:
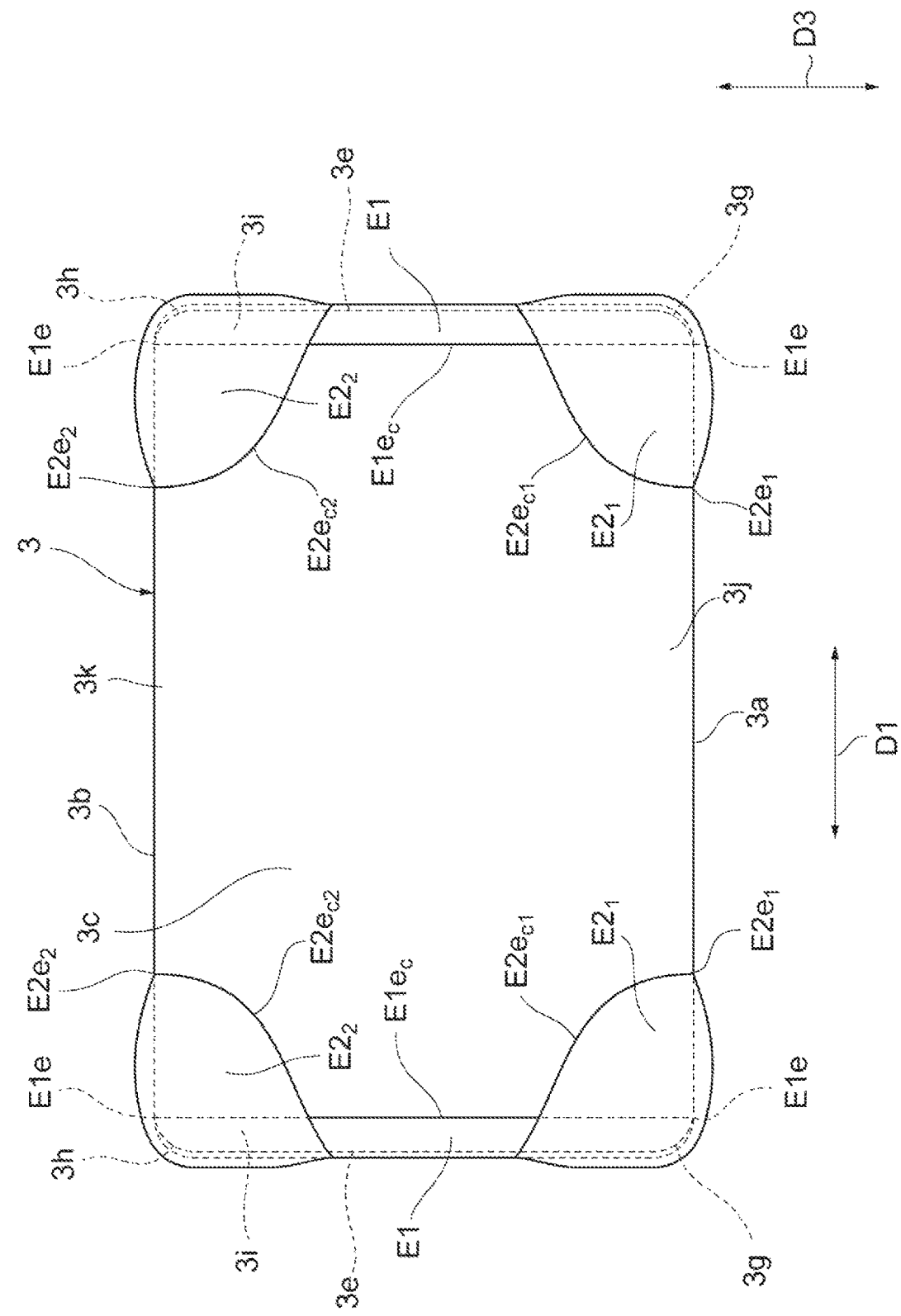
FIG. 21 is a side view illustrating the element body, the first electrode layer, and the second electrode layer.
Figure 22:
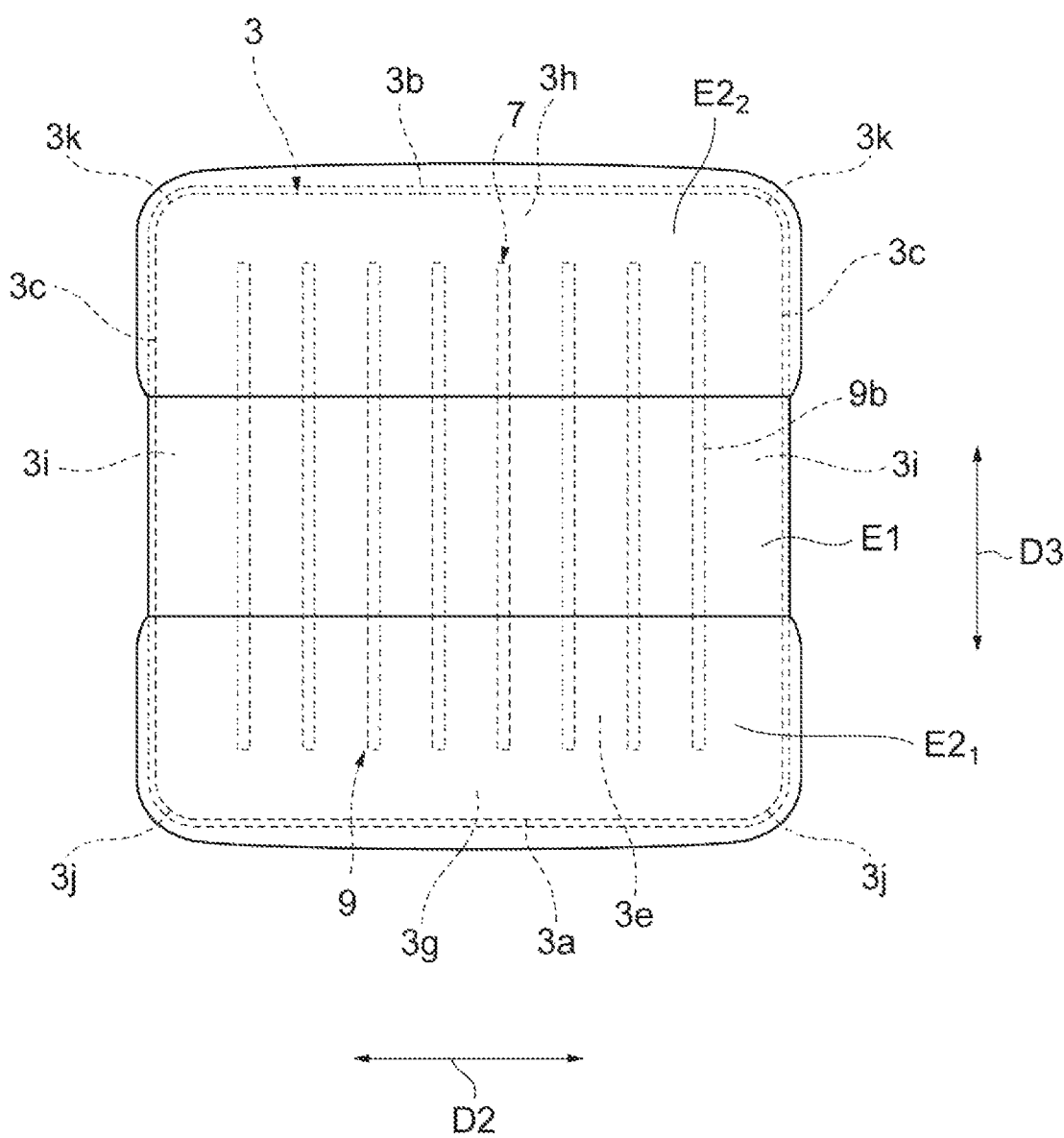
FIG. 22 is an end view illustrating the element body, the first electrode layer, and the second electrode layer.

A configuration of a multilayer capacitor C2 according to a second embodiment will be described with reference to FIGS. 11 to 22. FIG. 11 is a perspective view of the multilayer capacitor according to the second embodiment. FIG. 12 is a side view of the multilayer capacitor according to the second embodiment. FIGS. 13 to 18 are views illustrating a cross-sectional configuration of the multilayer capacitor according to the second embodiment. FIGS. 19 and 20 are plan views illustrating an element body, a first electrode layer, and a second electrode layer. FIG. 21 is a side view illustrating the element body, the first electrode layer, and the second electrode layer. FIG. 22 is an end view illustrating the element body, the first electrode layer, and the second electrode layer. In the second embodiment, an electronic component is, for example, the multilayer capacitor C2.

As illustrated in FIGS. 11 and 12, the multilayer capacitor C2 includes the element body 3 and the plurality of external electrodes 5. The principal surface 3a of the multilayer capacitor C2 opposes the electronic device. The principal surface 3a is arranged to constitute a mounting surface. In the multilayer capacitor C2, the principal surface 3b may be arranged to constitute the mounting surface. In the multilayer capacitor C2, a configuration of the external electrodes 5 is different from that in the multilayer capacitor C1. Hereinafter, differences between the multilayer capacitor C1 and the multilayer capacitor C2 will be mainly described.

As illustrated in FIGS. 13 to 16, the external electrode 5 includes a plurality of electrode portions 5a, 5b, 5c, and 5e. The electrode portion 5b is disposed on the principal surface 3b and on the ridge portion 3h. The external electrode 5 is formed on the five surfaces, that is, the pair of the principal surface 3a and 3b, the end surface 3e, and the pair of side surfaces 3c, as well as on the ridge portions 3g, 3h, 3i, and 3j. The electrode portion 5a includes the first electrode layer E1, the second electrode layer $E2_1$, the third electrode layer E3, and the fourth electrode layer E4. The electrode portion 5b includes the first electrode layer E1, the second electrode layer $E2_2$, the third electrode layer E3, and the fourth electrode layer E4. Each of the electrode portions 5c and 5e includes the first electrode layer E1, the second electrode layers $E2_1$ and $E2_2$, the third electrode layer E3, and the fourth electrode layer E4.

The second electrode layer $E2_1$ included in the electrode portion 5a is disposed on the first electrode layer E1 and on the principal surface 3a. The first electrode layer E1 included in the electrode portion 5a is entirely covered with the second electrode layer $E2_1$. The second electrode layer $E2_1$ included in the electrode portion 5a is in contact with one part of the principal surface 3a and the entire first electrode layer E1. The one part of the principal surface 3a is, for example, the partial region near the end surface 3e, in the principal surface 3a. That is, the one part of the principal surface 3a is close to the end surface 3e. The electrode portion 5a is four-layered on the ridge portion 3g, and is three-layered on the principal surface 3a. The second electrode layer $E2_1$ included in the electrode portion 5a is formed to cover the entire ridge portion 3g and the one part of the principal surface 3a. The one part of the principal surface 3a is, for example, the partial region near the end surface 3e, in the principal surface 3a. That is, the one part of the principal surface 3a is close to the end surface 3e. The second electrode layer $E2_1$ included in the electrode portion 5a indirectly covers the entire ridge portion 3g in such a manner that the first electrode layer E1 is positioned between the second electrode layer $E2_1$ and the ridge portion 3g. The second electrode layer $E2_1$ included in the electrode portion 5a directly covers an entire portion of the first electrode layer E1 formed on the ridge portion 3g. The second electrode layer $E2_1$ included in the electrode portion 5a directly covers the one part of the principal surface 3a.

The first electrode layer E1 included in the electrode portion 5b is disposed on the ridge portion 3h, and is not disposed on the principal surface 3b. The first electrode layer E1 included in the electrode portion 5b is in contact with the entire ridge portion 3h. The principal surface 3b is not covered with the first electrode layer E1, and is exposed from the first electrode layer E1. The second electrode layer $E2_2$ included in the electrode portion 5b is disposed on the first electrode layer E1 and on the principal surface 3b. The first electrode layer E1 included in the electrode portion 5b is entirely covered with the second electrode layer $E2_2$. The second electrode layer $E2_2$ included in the electrode portion 5b is in contact with one part of the principal surface 3b and the entire first electrode layer E1. The one part of the principal surface 3b is, for example, a partial region near the end surface 3e, in the principal surface 3b. That is, the one part of the principal surface 3b is close to the end surface 3e. The electrode portion 5b is four-layered on the ridge portion 3h, and is three-layered on the principal surface 3b.

The second electrode layer $E2_2$ included in the electrode portion 5b is formed to cover the entire ridge portion 3h and the one part of the principal surface 3b. The one part of the principal surface 3b is, for example, the partial region near the end surface 3e, in the principal surface 3b. That is, the one part of the principal surface 3b is close to the end surface 3e. The second electrode layer $E2_2$ included in the electrode portion 5a indirectly covers the entire ridge portion 3h in such a manner that the first electrode layer E1 is positioned between the second electrode layer $E2_2$ and the ridge portion 3h. The second electrode layer $E2_2$ included in the electrode portion 5b directly covers an entire portion of the first electrode layer E1 formed on the ridge portion 3h. The second electrode layer $E2_2$ included in the electrode portion 5b directly covers the one part of the principal surface 3b.

The first electrode layer E1 included in the electrode portion 5c is disposed on the ridge portion 3i, and is not disposed on the side surface 3c. The first electrode layer E1 included in the electrode portion 5c is in contact with the entire ridge portion 3i. The side surface 3c is not covered with the first electrode layer E1, and is exposed from the first electrode layer E1. Each of the second electrode layers $E2_1$ and $E2_2$ included in the electrode portion 5c is disposed on the first electrode layer E1 and on the side surface 3c. Each of the second electrode layers $E2_1$ and $E2_2$ covers one part of the first electrode layer E1. Each of the second electrode layers $E2_1$ and $E2_2$ included in the electrode portion 5c is in contact with one part of the side surface 3c and the one part of the first electrode layer E1. Each of the second electrode layers $E2_1$ and $E2_2$ included in the electrode portion 5c includes a portion positioned on the side surface 3c.

The second electrode layer $E2_1$ included in the electrode portion 5c is formed to cover one part of the ridge portion 3i and one part of the side surface 3c. The one part of the ridge portion 3i is, for example, a partial region near the principal surface 3a, in the ridge portion 3i. That is, the one part of the ridge portion 3i is close to the principal surface 3a. The one part of the side surface 3c is, for example, a corner region near the principal surface 3a and end surface 3e, in the side surface 3c. That is, the one part of the side surface 3c is close to the principal surface 3a and end surface 3e. The second electrode layer $E2_1$ included in the electrode portion 5c indirectly covers the one part of the ridge portion 3i in such a manner that the first electrode layer E1 is positioned between the second electrode layer $E2_1$ and the ridge portion 3i. The second electrode layer $E2_1$ included in the electrode portion 5c directly covers one part of the portion of the first electrode layer E1 formed on the ridge portion 3i. The second electrode layer $E2_1$ included in the electrode portion 5c directly covers the one part of the side surface 3c.

The second electrode layer $E2_2$ included in the electrode portion $5c$ is formed to cover one part of the ridge portion $3i$ and one part of the side surface $3c$. The one part of the ridge portion $3i$ is, for example, a partial region near the principal surface $3b$, in the ridge portion $3i$. That is, the one part of the ridge portion $3i$ is close to the principal surface $3b$. The one part of the side surface $3c$ is, for example, a corner region near the principal surface $3b$ and end surface $3e$, in the side surface $3c$. That is, the one part of the side surface $3c$ is close to the principal surface $3b$ and end surface $3e$. The second electrode layer $E2_2$ included in the electrode portion $5c$ indirectly covers the one part of the ridge portion $3i$ in such a manner that the first electrode layer E1 is positioned between the second electrode layer $E2_2$ and the ridge portion $3i$. The second electrode layer $E2_2$ included in the electrode portion $5c$ directly covers one part of the portion of the first electrode layer E1 formed on the ridge portion $3i$. The second electrode layer $E2_2$ included in the electrode portion $5c$ directly covers the one part of the side surface $3c$.

The electrode portion $5c$ includes a plurality of regions $5c_1$, $5c_2$, and $5c_3$. In the second embodiment, the electrode portion $5c$ includes only three regions $5c_1$, $5c_2$, and $5c_3$. The region $5c_2$ is positioned closer to the principal surface $3a$ than the region $5c_1$. The region $5c_3$ is positioned closer to the principal surface $3b$ than the region $5c_1$. The region $5c_1$ includes the first electrode layer E1, the third electrode layer E3, and the fourth electrode layer E4. The region $5c_1$ does not include the second electrode layers $E2_1$ and $E2_2$. The region $5c_1$ is three-layered. The region $5c_2$ includes the first electrode layer E1, the second electrode layer $E2_1$, the third electrode layer E3, and the fourth electrode layer E4. The region $5c_3$ includes the first electrode layer E1, the second electrode layer $E2_2$, the third electrode layer E3, and the fourth electrode layer E4. Each of the regions $5c_2$ and $5c_3$ is four-layered on the ridge portion $3i$, and is three-layered on the side surface $3c$. The region $5c_1$ is the region where the first electrode layer E1 is exposed from the second electrode layers $E2_1$ and $E2_2$. The region $5c_2$ is the region where the first electrode layer E1 is covered with the second electrode layer $E2_1$. The region $5c_3$ is the region where the first electrode layer E1 is covered with the second electrode layer $E2_2$.

The second electrode layer $E2_1$ included in the electrode portion $5e$ is disposed on the first electrode layer E1. The first electrode layer E1 is partially covered with the second electrode layer $E2_1$. The second electrode layer $E2_1$ included in the electrode portion $5e$ is in contact with one part of the first electrode layer E1. The second electrode layer $E2_1$ included in the electrode portion $5e$ is formed to cover one part of the end surface $3e$. The one part of the end surface $3e$ is, for example, a partial region near the principal surface $3a$, in the end surface $3e$. That is, the one part of the end surface $3e$ is close to the principal surface $3a$. The second electrode layer $E2_1$ included in the electrode portion $5e$ indirectly covers the one part of the end surface $3e$ in such a manner that the first electrode layer E1 is positioned between the second electrode layer $E2_1$ and the end surface $3e$. The second electrode layer $E2_1$ included in the electrode portion $5e$ directly covers one part of the portion of the first electrode layer E1 formed on the end surface $3e$.

The second electrode layer $E2_2$ included in the electrode portion $5e$ is disposed on the first electrode layer E1. The first electrode layer E1 is partially covered with the second electrode layer $E2_2$. The second electrode layer $E2_2$ included in the electrode portion $5e$ is in contact with one part of the first electrode layer E1. The second electrode layer $E2_2$ included in the electrode portion $5e$ is formed to cover one part of the end surface $3e$. The one part of the end surface $3e$ is, for example, a partial region near the principal surface $3b$, in the end surface $3e$. That is, the one part of the end surface $3e$ is close to the principal surface $3b$. The second electrode layer $E2_2$ included in the electrode portion $5e$ indirectly covers the one part of the end surface $3e$ in such a manner that the first electrode layer E1 is positioned between the second electrode layer $E2_2$ and the end surface $3e$. The second electrode layer $E2_2$ included in the electrode portion $5e$ directly covers one part of the portion of the first electrode layer E1 formed on the end surface $3e$.

The electrode portion $5e$ includes a plurality of regions $5e_1$, $5e_2$, and $5e_3$. In the second embodiment, the electrode portion $5e$ includes only three regions $5e_1$, $5e_2$, and $5e_3$. The region $5e_2$ is positioned closer to the principal surface $3a$ than the region $5e_1$. The region $5e_3$ is positioned closer to the principal surface $3b$ than the region $5e_1$. The region $5e_1$ includes the first electrode layer E1, the third electrode layer E3, and the fourth electrode layer E4. The region $5e_1$ does not include the second electrode layers $E2_1$ and $E2_2$. The region $5e_1$ is three-layered. The region $5e_2$ includes the first electrode layer E1, the second electrode layer $E2_1$, the third electrode layer E3, and the fourth electrode layer E4. The region $5e_3$ includes the first electrode layer E1, the second electrode layer $E2_2$, the third electrode layer E3, and the fourth electrode layer E4. Each of the regions $5e_2$ and $5e_3$ is four-layered. The region $5e_1$ is the region where the first electrode layer E1 is exposed from the second electrode layers $E2_1$ and $E2_2$. The region $5e_2$ is the region where the first electrode layer E1 is covered with the second electrode layer $E2_1$. The region $5e_3$ is the region where the first electrode layer E1 is covered with the second electrode layer $E2_2$.

The second electrode layers $E2_1$ and $E2_2$ are formed by curing conductive resin applied onto the first electrode layer E1, the pair of the principal surfaces $3a$ and $3b$, and the pair of side surfaces $3c$. Each of the second electrode layers $E2_1$ and $E2_2$ includes a conductive resin layer. The second electrode layers $E2_1$ and $E2_2$ are formed over the first electrode layer E1 and the element body 3. The first electrode layer E1 serves as an underlying metal layer for forming the second electrode layers $E2_1$ and $E2_2$. Each of the second electrode layers $E2_1$ and $E2_2$ is a conductive resin layers formed on the first electrode layer E1.

In the second embodiment, the second electrode layer $E2_1$ covers one part of the first electrode layer E1. The one part of the first electrode layer E1 is, for example, the regions corresponding to the electrode portion $5a$, the region $5c_2$ of the electrode portion $5c$, and the region $5e_2$ of the electrode portion $5e$, in the first electrode layer E1. The second electrode layer $E2_1$ directly covers one part of the ridge portion $3j$. The one part of the ridge portion $3j$ is, for example, a partial region near the end surface $3e$, in the ridge portion $3j$. That is, the one part of the ridge portion $3j$ is close to the end surface $3e$. The second electrode layer $E2_1$ is in contact with the one part of the ridge portion $3j$. The second electrode layer $E2_2$ covers one part of the first electrode layer E1. The one part of the first electrode layer E1 is, for example, the regions corresponding to the electrode portion $5b$, the region $5c_3$ of the electrode portion $5c$, and the region $5e_3$ of the electrode portion $5e$, in the first electrode layer E1. The second electrode layer $E2_2$ directly covers one part of the ridge portion $3k$. The one part of the ridge portion $3k$ is, for example, a partial region near the end surface $3e$, in the ridge portion $3k$. That is, the one part of the ridge portion $3k$ is close to the end surface $3e$. The second electrode layer $E2_2$ is in contact with the one part of the ridge portion 3k. The second electrode layer E2$_1$ included in the electrode portion 5a, the second electrode layer E2$_1$ included in the electrode portion 5c, and the second electrode layer E2$_1$ included in the electrode portion 5e are integrally formed. The second electrode layer E2$_2$ included in the electrode portion 5a, the second electrode layer E2$_2$ included in the electrode portion 5c, and the second electrode layer E2$_2$ included in the electrode portion 5e are integrally formed.

The third electrode layer E3 is formed on the second electrode layers E2$_1$ and E2$_2$ and the first electrode layer E1 by plating method. The third electrode layer E3 is formed on a portion of the first electrode layer E1 exposed from the second electrode layers E2$_1$ and E2$_2$. The fourth electrode layer E4 is formed on the third electrode layer E3 by plating method. The third electrode layer E3 and the fourth electrode layer E4 constitute a plating layer formed on the second electrode layers E2$_1$ and E2$_2$. In the second embodiment, the plating layer formed on the second electrode layers E2$_1$ and E2$_2$ is two-layered.

The second electrode layer E2$_1$ (second electrode layer E2$_1$ included in the electrode portions 5a, 5c, and 5e) continuously covers one part of the principal surface 3a, one part of the end surface 3e, and one part of each of the pair of side surfaces 3c. The second electrode layer E2$_1$ (second electrode layer E2$_1$ included in the electrode portions 5a, 5c, and 5e) covers the entire ridge portion 3g, one part of the ridge portion 3i, and one part of the ridge portion 3j. The second electrode layer E2$_1$ includes a plurality of portions each corresponding to the one part of the principal surface 3a, the one part of the end surface 3e, the one part of each of the pair of side surfaces 3c, the entire ridge portion 3g, the one part of the ridge portion 3i, and the one part of the ridge portion 3j.

The second electrode layer E2$_2$ (second electrode layer E2$_2$ included in the electrode portions 5b, 5c, and 5e) continuously covers one part of the principal surface 3b, one part of the end surface 3e, and one part of each of the pair of side surfaces 3c. The second electrode layer E2$_2$ (second electrode layer E2$_2$ included in the electrode portions 5b, 5c, and 5e) covers the entire ridge portion 3h, one part of the ridge portion 3i, and one part of the ridge portion 3k. The second electrode layer E2$_2$ includes a plurality of portions each corresponding to the one part of the principal surface 3b, the one part of the end surface 3e, the one part of each of the pair of side surfaces 3c, the entire ridge portion 3h, the one part of the ridge portion 3i, and the one part of the ridge portion 3k.

The first electrode layer E1 (first electrode layer E1 included in the electrode portions 5a, 5b, 5c, and 5e) includes a region covered with the second electrode layer E2$_1$ (second electrode layer E2$_1$ included in the electrode portions 5a, 5c, and 5e) and the second electrode layer E2$_2$ (second electrode layer E2$_2$ included in the electrode portions 5b, 5c, and 5e), and a region not covered with the second electrode layer E2$_1$ (second electrode layer E2$_1$ included in the electrode portions 5a, 5c, and 5e) and the second electrode layer E2$_2$ (second electrode layer E2$_2$ included in the electrode portions 5b, 5c, and 5e). The region not covered with the second electrode layers E2$_1$ and E2$_2$ is a region exposed from the second electrode layers E2$_1$ and E2$_2$. The third electrode layer E3 and the fourth electrode layer E4 cover the region on the first electrode layer E1 not covered with the second electrode layers E2$_1$ and E2$_2$ and the second electrode layers E2$_1$ and E2$_2$.

Figure 17:
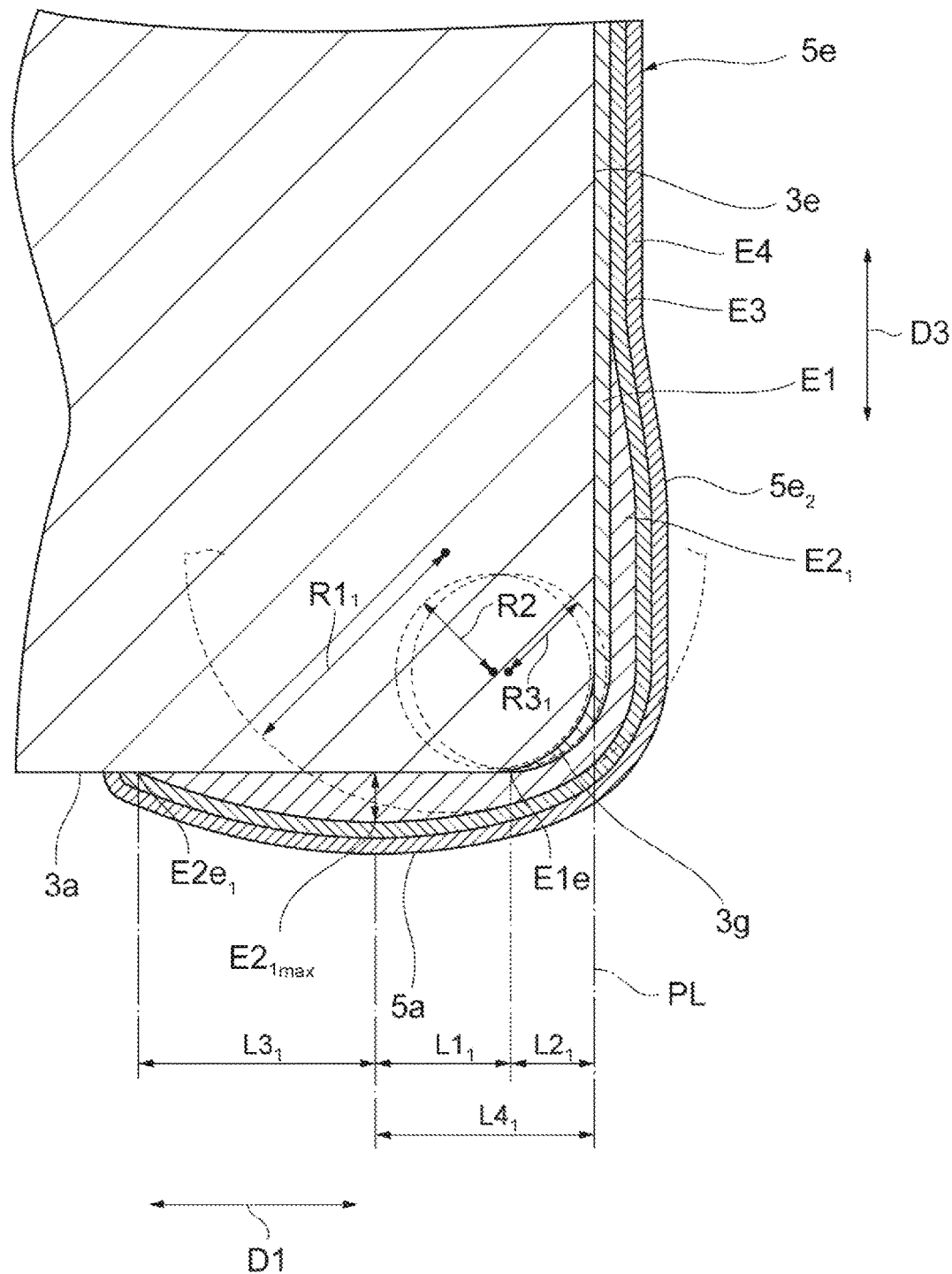
FIG. 17 is a view illustrating the cross-sectional configuration of the multilayer capacitor according to the second embodiment.

As illustrated in FIG. 17, the second electrode layer E2$_1$ included in the electrode portion 5a has a maximum thickness position E2$_{1max}$. The maximum thickness position E2$_{1max}$ has a largest thickness in the second electrode layer E2$_1$ included in the electrode portion 5a. In the first direction D1, the end edge E1e of the first electrode layer E1 is positioned closer to the end surface 3e than the maximum thickness position E2$_{1max}$. The second electrode layer E2$_1$ included in the electrode portion 5a includes a first portion positioned on the principal surface 3a, and a second portion positioned on the ridge portion 3g (the first electrode layer E1). Also in the second embodiment, the first portion is in contact with the principal surface 3a, and the second portion is in contact with the first electrode layer E1. In the second embodiment, the maximum thickness position E2$_{1max}$ is present in the first portion of the second electrode layer E2$_1$. In the first portion, the thickness of the second electrode layer E2$_1$ included in the electrode portion 5a is a thickness in the direction orthogonal to the principal surface 3a. In the second portion, the thickness of the second electrode layer E2$_1$ included in the electrode portion 5a is a thickness in a normal direction of the ridge portion 3g (curved surface).

A thickness in the first portion of the second electrode layer E2$_1$ gradually decreases from the maximum thickness position E2$_{1max}$ to the second portion. The thickness in the first portion of the second electrode layer E2$_1$ gradually decreases from the maximum thickness position E2$_{1max}$ to the end edge E2e$_1$ of the second electrode layer E2$_1$. A thickness of the maximum thickness position E2$_{1max}$, that is, a maximum thickness of the second electrode layer E2$_1$ included in the electrode portion 5a is equal to or larger than 30 μm. In the second embodiment, the maximum thickness of the second electrode layer E2$_1$ included in the electrode portion 5a is 100 μm.

A surface of the second electrode layer E2$_1$ curves as the result of changes in the thickness in the second electrode layer E2$_1$ of the electrode portion 5a. The surface of the first electrode layer E1 curves at the portion positioned on the ridge portion 3g. In a cross-section orthogonal to the end surface 3e and the principal surface 3a, a radius of curvature R1$_1$ of the surface of the second electrode layer E2$_1$ is larger than the radius of curvature R2 of the ridge portion 3g (curved surface), and larger than a radius of curvature R3$_1$ of the surface of the first electrode layer E1. The radius of curvature R1$_1$ is, for example, 100 to 700 μm. In the second embodiment, the radius of curvature R1$_1$ is 350 μm. The radius of curvature R3$_1$ is, for example, the same as the radius of curvature R3 in the first embodiment.

Figure 16:
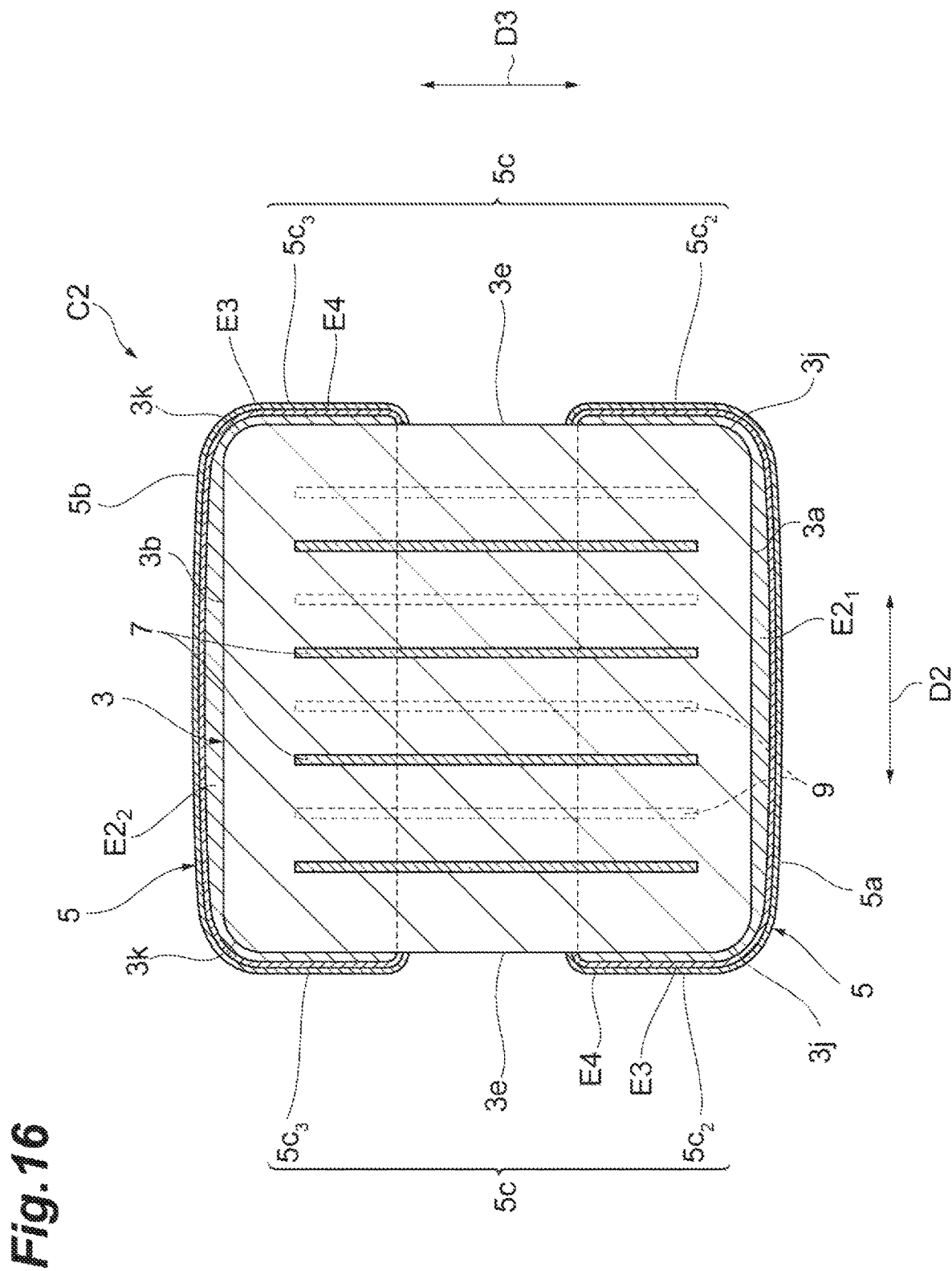
FIG. 16 is a view illustrating the cross-sectional configuration of the multilayer capacitor according to the second embodiment.

As illustrated in FIG. 16, the thickness of the first portion of the second electrode layer E2$_1$ is larger at the center in the second direction D2 than at the end in the second direction D2, when viewed from the first direction D1. In the second embodiment, the thickness of the first portion of the second electrode layer E2$_1$ is largest at the center in the second direction. D2, and gradually decreases to the end in the second direction D2. The maximum thickness of the second electrode layer E2$_1$ included in the electrode portion 5a is larger than a maximum thickness of the second electrode layer E2$_1$ included in the region 5c$_2$. The thickness of the second electrode layer E2$_1$ included in the region 5c$_2$ is a thickness in the direction orthogonal to the side surface 3c. The second electrode layer E2$_1$ included in the region 5c$_2$ includes a portion positioned on the side surface 3c. The maximum thickness of the second electrode layer E2$_1$ included in the region 5c$_2$ is equal to or larger than 5 μm. In the second embodiment, the maximum thickness of the second electrode layer E2$_1$ included in the region 5c$_2$ is 15 μm.

As illustrated in FIG. 17, a length $L1_1$, in the first direction D1, from the end edge E1e of the first electrode layer E1 to the maximum thickness position $E2_{1max}$ is larger than a length $L2_1$, in the first direction D1, from the reference plane PL to the end edge E1e of the first electrode layer E1. The length $L1_1$ is, for example, 100 to 400 µm. In the second embodiment, the length $L1_1$ is 250 µm. The length $L2_1$ is, for example, 75 to 300 µm. In the second embodiment, the length $L2_1$ is 200 µm.

A length $L3_1$, in the first direction D1, from the maximum thickness position $E2_{1max}$ to the end edge $E2e_1$ of the second electrode layer $E2_1$ is larger than a length $L4_1$, in the first direction D1, from the reference plane PL to the maximum thickness position $E2_{1max}$. The length $L3_1$ is larger than the length $L1_1$. The length $L3_1$ is, for example, 175 to 700 µm. In the second embodiment, the length $L3_1$ is 500 µm. The length $L4_1$ is the sum of the length $L1_1$ and the length $L2_1$. In the second embodiment, the length $L4_1$ is 450 µm.

Figure 18:
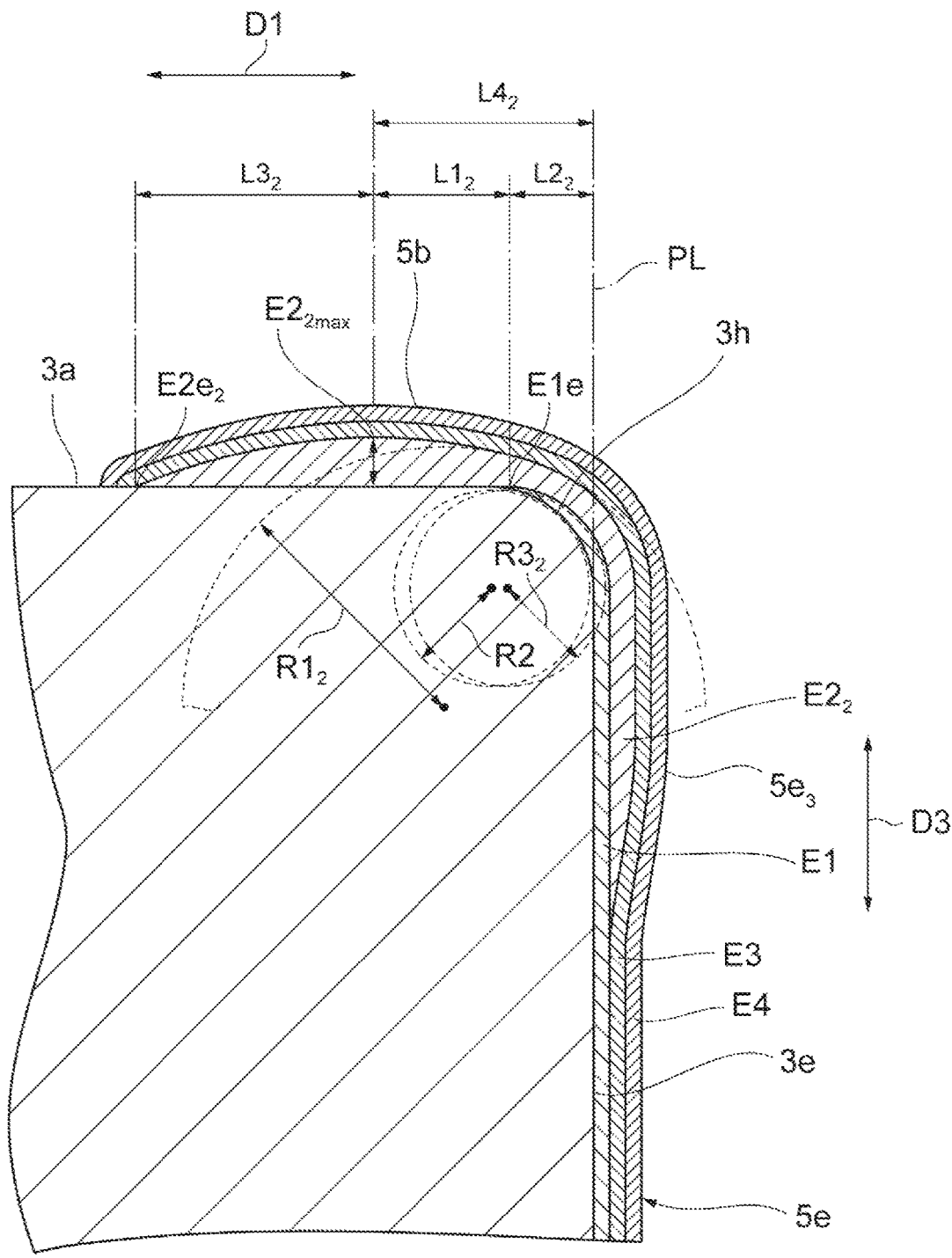
FIG. 18 is a view illustrating the cross-sectional configuration of the multilayer capacitor according to the second embodiment.

As illustrated in FIG. 18, the second electrode layer $E2_2$ included in the electrode portion 5b has a maximum thickness position $E2_{2max}$. The maximum thickness position $E2_{2max}$ has a largest thickness in the second electrode layer $E2_2$ included in the electrode portion 5b. In the first direction D1, the end edge E1e of the first electrode layer E1 is positioned closer to the end surface 3e than the maximum thickness position $E2_{2max}$. The second electrode layer $E2_2$ included in the electrode portion 5b includes a third portion positioned on the principal surface 3b, and a fourth portion positioned on the ridge portion 3h (the first electrode layer E1). In the second embodiment, the third portion is in contact with the principal surface 3b, and the fourth portion is in contact with the first electrode layer E1. In the second embodiment, the maximum thickness position $E2_{2max}$ is present in the third portion of the second electrode layer $E2_2$. In the third portion, the thickness of the second electrode layer $E2_2$ included in the electrode portion 5b is a thickness in the direction orthogonal to the principal surface 3b. In the fourth portion, the thickness of the second electrode layer $E2_2$ included in the electrode portion 5b is a thickness in a normal direction of the ridge portion 3h (curved surface).

A thickness in the third portion of the second electrode layer $E2_2$ gradually decreases from the maximum thickness position $E2_{2max}$ to the fourth portion. The thickness in the third portion of the second electrode layer $E2_2$ gradually decreases from the maximum thickness position $E2_{2max}$ to the end edge $E2e_2$ of the second electrode layer $E2_2$. A thickness of the maximum thickness position $E2_{2max}$, that is, a maximum thickness of the second electrode layer $E2_2$ included in the electrode portion 5b is equal to or larger than 30 µm. In the second embodiment, the maximum thickness of the second electrode layer $E2_2$ included in the electrode portion 5b is 100 µm. The thicknesses of the maximum thickness position $E2_{1max}$ and $E2_{2max}$ may be approximately equivalent to each other or different from each other.

A surface of the second electrode layer $E2_2$ curves as the result of changes in the thickness in the second electrode layer $E2_2$ of the electrode portion 5b. The surface of the first electrode layer E1 curves at a portion positioned on the ridge portion 3h. In a cross-section orthogonal to the end surface 3e and the principal surface 3b, a radius of curvature $R1_2$ of the surface of the second electrode layer $E2_2$ is larger than the radius of curvature R2 of the ridge portion 3h (curved surface), and larger than a radius of curvature $R3_2$ of the surface of the first electrode layer E1. The radius of curvature $R1_2$ is, for example, 100 to 700 µm. In the second embodiment, the radius of curvature $R1_2$ is 350 µm. The radius of curvature $R3_2$ is, for example, the same as the radius of curvature R3 in the first embodiment. The radii of curvature $R1_1$ and $R1_2$ may be approximately equivalent to each other or different from each other. The radii of curvature $R3_1$ and $R3_2$ may be approximately equivalent to each other or different from each other.

As illustrated in FIG. 16, the thickness of the third portion of the second electrode layer $E2_2$ is larger at a center in the second direction D2 than at an end in the second direction D2, when viewed from the first direction D1. In the second embodiment, the thickness of the third portion of the second electrode layer $E2_2$ is largest at the center in the second direction D2, and gradually decreases to the end in the second direction D2. The maximum thickness of the second electrode layer $E2_2$ included in the electrode portion 5b is larger than a maximum thickness of the second electrode layer $E2_2$ included in the region $5c_3$. The thickness of the second electrode layer $E2_2$ included in the region $5c_3$ is a thickness in the direction orthogonal to the side surface 3c. The second electrode layer $E2_2$ included in the region $5c_3$ includes a portion positioned on the side surface 3c. The maximum thickness of the second electrode layer $E2_2$ included in the region $5c_3$ is equal to or larger than 5 µm. In the second embodiment, the maximum thickness of the second electrode layer $E2_2$ included in the region $5c_3$ is 15 µm.

As illustrated in FIG. 18, a length $L1_2$, in the first direction D1, from the end edge E1e of the first electrode layer E1 to the maximum thickness position $E2_{2max}$ is larger than a length $L2_2$, in the first direction D1, from the reference plane PL to the end edge E1e of the first electrode layer E1. The length $L1_2$ is, for example, 100 to 400 µm. In the second embodiment, the length $L1_2$ is 250 µm. The length $L2_2$ is, for example, 75 to 300 µm. In the second embodiment, the length $L2_2$ is 200 µm. The lengths $L1_1$ and $L1_2$ may be approximately equivalent to each other or different from each other. The lengths $L2_1$ and $L2_2$ may be approximately equivalent to each other or different from each other.

A length $L3_2$, in the first direction D1, from the maximum thickness position $E2_{2max}$ to the end edge $E2e_2$ of the second electrode layer $E2_2$ is larger than a length $L4_2$, in the first direction D1, from the reference plane PL to the maximum thickness position $E2_{2max}$. The length $L3_2$ is larger than the length $L1_2$. The length $L3_2$ is, for example, 175 to 700 µm. In the second embodiment, the length $L3_2$ is 500 µm. The length $L4_2$ is the sum of the length $L1_2$ and the length $L2_2$. In the second embodiment, the length $L4_2$ is 450 µm. The lengths $L3_1$ and $L3_2$ may be approximately equivalent to each other or different from each other. The lengths $L4_1$ and $L4_2$ may be approximately equivalent to each other or different from each other.

As illustrated in FIG. 19, when viewed from the third direction D3, the first electrode layer E1 (first electrode layer E1 included in the electrode portion 5a) is entirely covered with the second electrode layer $E2_1$. When viewed from the third direction D3, the first electrode layer E1 (first electrode layer E1 included in the electrode portion 5a) is not exposed from the second electrode layer $E2_1$. As illustrated in FIG. 20, when viewed from the third direction D3, the first electrode layer E1 (first electrode layer E1 included in the electrode portion 5b) is entirely covered with the second electrode layer $E2_2$. When viewed from the third direction D3, the first electrode layer E1 (first electrode layer E1 included in the electrode portion 5b) is not exposed from the second electrode layer $E2_2$.

As illustrated in FIG. 21, when viewed from the second direction D2, the first end region near the principal surface 3a of the first electrode layer E1 is covered with the second electrode layer $E2_1$. The first end region of the first electrode layer E1 includes the first electrode layer E1 included in the region $5c_2$. The first end region of the first electrode layer E1 is close to the principal surface 3a. When viewed from the second direction D2, an end edge $E2e_{c1}$ of the second electrode layer $E2_1$ crosses the end edge $E1e_c$ of the first electrode layer E1. When viewed from the second direction D2, the second end region near the principal surface 3b of the first electrode layer E1 is covered with the second electrode layer $E2_2$. The second end region of the first electrode layer E1 includes the first electrode layer E1 included in the region $5c_3$. The second end region of the first electrode layer E1 is close to the principal surface 3b. When viewed from the second direction D2, an end edge $E2e_{c2}$ of the second electrode layer $E2_2$ crosses the end edge $E1e_c$ of the first electrode layer E1. When viewed from the second direction D2, a central region of the first electrode layer E1 in the third direction D3 is exposed from the second electrode layers $E2_1$ and $E2_2$. The central region of the first electrode layer E1 in the third direction D3 includes the first electrode layer E1 included in the region $5c_1$. When viewed from the second direction D2, the second electrode layer $E2_1$ and the second electrode layer $E2_2$ are separated from each other in the third direction D3. The second electrode layers $E2_1$ and $E2_2$ positioned on the side surface 3c oppose the internal electrodes 7 and 9 having polarities different from those of the second electrode layers $E2_1$ and $E2_2$ in the second direction D2.

As illustrated in FIG. 22, when viewed from the first direction D1, the third end region near the principal surface 3a of the first electrode layer E1 is covered with the second electrode layer $E2_1$. The third end region of the first electrode layer E1 includes the first electrode layer E1 included in the region $5e_2$. The third end region of the first electrode layer E1 is close to the principal surface 3a. When viewed from the first direction D1, an end edge of the second electrode layer $E2_1$ is positioned on the first electrode layer E1. When viewed from the first direction D1, the fourth end region near the principal surface 3b of the first electrode layer E1 is covered with the second electrode layer $E2_2$. The fourth end region of the first electrode layer E1 includes the first electrode layer E1 included in the region $5e_3$. The fourth end region of the first electrode layer E1 is close to the principal surface 3b. When viewed from the first direction D1, an end edge of the second electrode layer $E2_2$ is positioned on the first electrode layer E1. When viewed from the first direction D1, a central region of the first electrode layer E1 in the third direction D3 is exposed from the second electrode layers $E2_1$ and $E2_2$. The central region of the first electrode layer E1 in the first direction D1 includes the first electrode layer E1 included in the region $5e_1$. When viewed from the first direction D1, the second electrode layer $E2_1$ and the second electrode layer $E2_2$ are separated from each other in the third direction D3. The first electrode layer E1 included in the electrode portion 5e includes a region covered with the second electrode layer $E2_1$, a region covered with the second electrode layer $E2_2$, and a region exposed from the second electrode layers $E2_1$ and $E2_2$. The third electrode layer E3 and the fourth electrode layer E4 cover the region on the first electrode layer E1 exposed from the second electrode layers $E2_1$ and $E2_2$ and the second electrode layers $E2_1$ and $E2_2$.

In the second embodiment, the second electrode layer $E2_1$ continuously covers only the one part of the principal surface 3a, only the one part of the end surface 3e, and only the one part of each of the pair of side surfaces 3c. The second electrode layer $E2_1$ covers the entire ridge portion 3g, only the one part of the ridge portion 3i, and only the one part of the ridge portion 3j. The second electrode layer $E2_2$ continuously covers only the one part of the principal surface 3b, only the one part of the end surface 3e, and only the one part of each of the pair of side surfaces 3c. The second electrode layer $E2_2$ covers the entire ridge portion 3h, only the one part of the ridge portion 3i, and only the one part of the ridge portion 3k. The portion of the first electrode layer E1 covering the ridge portion 3i is partially exposed from the second electrode layers $E2_1$ and $E2_2$. For example, the first electrode layer E1 included in the region $5c_1$ is exposed from the second electrode layers $E2_1$ and $E2_2$.

As illustrated in FIG. 12, a width of the region $5c_2$ in the first direction D1 decreases with an increase in distance from the principal surface 3a. The width of the region $5c_2$ in the first direction D1 decreases with an increase in distance from the electrode portion 5a. A width of the region $5c_3$ in the first direction D1 decreases with an increase in distance from the principal surface 3b. The width of the region $5c_3$ in the first direction D1 decreases with an increase in distance from the electrode portion 5b. A width of each of the regions $5c_2$ and $5c_3$ in the third direction D3 decreases with an increase in distance from the end surface 3e. The width of each of the regions $5c_2$ and $5c_3$ in the third direction D3 decreases with an increase in distance from the electrode portion 5e. In the second embodiment, when viewed from the second direction D2, the end edge of each of the regions $5c_2$ and $5c_3$ has an approximately arc shape. When viewed from the second direction D2, each of the regions $5c_2$ and $5c_3$ has an approximately fan shape. As illustrated in FIG. 19, in the second embodiment, a width of the second electrode layer $E2_1$ when viewed from the second direction D2 decreases with an increase in distance from the principal surface 3a. A width of the second electrode layer $E2_2$ when viewed from the second direction D2 decreases with an increase in distance from the principal surface 3b. When viewed from the second direction D2, each of lengths of the second electrode layers $E2_1$ and $E2_2$ in the third direction D3 decreases with an increase in distance from the end surface 3e in the first direction D1. When viewed from the second direction D2, each of lengths of the portions of the second electrode layers $E2_1$ and $E2_2$ positioned on the side surface 3c, in the third direction D3 decreases with an increase in distance in the first direction D1 from the end of the element body 3. As illustrated in FIG. 19, when viewed from the second direction D2, the end edges $E2e_1$ of the second electrode layer $E2_1$ has an approximately arc shape. When viewed from the second direction D2, the end edges $E2e_2$ of the second electrode layer $E2_2$ has an approximately arc shape.

The second electrode layers $E2_1$ and $E2_2$ have the same configuration of the second electrode layers E2 in the first embodiment. Therefore, the multilayer capacitor C2 has the same operations and effects as the multilayer capacitor C1. In particular, the multilayer capacitor C2 further suppresses occurrence of a crack in the element body 3. In the multilayer capacitor C2, the second electrode layer E2 tends not to peel off from the element body 3 (principal surfaces 3a and 3b). The multilayer capacitor C2 further distributes the external force applied onto the external electrode 5, and thus further reduces the stress concentrating on the end edge E1e of the first electrode layer E1. The multilayer capacitor C2 improves moisture resistance reliability.

Although the embodiments and modifications of the present invention have been described above, the present invention is not necessarily limited to the embodiments and modifications, and the embodiment can be variously changed without departing from the scope of the invention.

The first electrode layer E1 may be formed on the principal surface 3a to extend over the ridge portion 3g entirely or partially from the end surface 3e. The first electrode layer E1 may be formed on the principal surface 3b to extend beyond the ridge portion 3h entirely or partially from the end surface 3e. In a case in which the first electrode layer E1 is formed on the principal surface 3b, an electrode portion disposed on the principal surface 3b may be four-layered. The first electrode layer E1 may be formed on the side surface 3c to extend beyond the ridge portion 3i entirely or partially from the end surface 3e. In a case in which the first electrode layer E1 is formed on the side surface 3c, an electrode portion disposed on the side surface 3c may be four-layered.

The number of internal electrodes 7 and 9 included in the multilayer capacitor C1 or C2 is not limited to the number of the internal electrodes 7 and 9 illustrated. In the multilayer capacitor C1 or C2, the number of the internal electrodes connected to one external electrode 5 (first electrode layer E1) may be one. The electronic component device ECD1 may include the multilayer capacitor C2 instead of the multilayer capacitor C1.

The electronic components of the present embodiments are the multilayer capacitors C1 and C2. Applicable electronic component is not limited to the multilayer capacitor. Examples of the applicable electronic components include, but not limited to, multilayer electronic components such as a multilayer inductor, a multilayer varistor, a multilayer piezoelectric actuator, a multilayer thermistor, or a multilayer composite component, and electronic components other than the multilayer electronic components.

What is claimed is:

1. An electronic component device, comprising:
an electronic device; and
an electronic component solder-mounted on the electronic device, the electronic component including:
  an element body of a rectangular parallelepiped shape including:
    a principal surface arranged to constitute a mounting surface;
    a pair of side surfaces opposing each other and adjacent to the principal surface;
    a pair of end surfaces opposing each other and adjacent to the principal surface and the pair of side surfaces; and
    a ridge portion between the principal surface and one of the end surfaces; and
  a plurality of external electrodes disposed at both end portions of the element body in a first direction in which the pair of end surfaces opposes each other, one of the plurality of external electrodes including:
    a sintered metal layer disposed on the respective end portion of the element body in contact with the ridge portion, an end edge of the sintered metal layer being positioned closer to the end surface than a maximum thickness position of the portion positioned on the principal surface, in the first direction; and
    a conductive resin layer including a portion positioned on and in contact with the principal surface and a portion positioned on the sintered metal layer, a thickness of the conductive resin layer gradually decreasing from the maximum thickness position to the portion positioned on the sintered metal layer,
  wherein a length from the end edge of the sintered metal layer to the maximum thickness position, in the first direction is larger than a length from a reference plane to the end edge of the sintered metal layer, in the first direction, the reference plane being defined as a plane including the end surface.

2. An electronic component device, comprising:
an electronic device; and
an electronic component solder-mounted on the electronic device, the electronic component including:
  an element body of a rectangular parallelepiped shape including:
    a principal surface arranged to constitute a mounting surface;
    a pair of side surfaces opposing each other and adjacent to the principal surface;
    a pair of end surfaces opposing each other and adjacent to the principal surface and the pair of side surfaces; and
    a ridge portion between the principal surface and one of the end surfaces; and
  a plurality of external electrodes disposed at both end portions of the element body in a first direction in which the pair of end surfaces opposes each other, one of the plurality of external electrodes including:
    a sintered metal layer disposed on the respective end portion of the element body in contact with the ridge portion, an end edge of the sintered metal layer being positioned closer to the end surface than a maximum thickness position of the portion positioned on the principal surface, in the first direction; and
    a conductive resin layer including a portion positioned on and in contact with the principal surface and a portion positioned on the sintered metal layer, a thickness of the conductive resin layer gradually decreasing from the maximum thickness position to the portion positioned on the sintered metal layer,
  wherein a length from the maximum thickness position to an end edge of the conductive resin layer, in the first direction is larger than a length from a reference plane to the maximum thickness position, in the first direction, the reference plane being defined as a plane including the end surface.

3. An electronic component device, comprising:
an electronic device; and
an electronic component solder-mounted on the electronic device, the electronic component including:
  an element body of a rectangular parallelepiped shape including:
    a principal surface arranged to constitute a mounting surface;
    a pair of side surfaces opposing each other and adjacent to the principal surface;
    a pair of end surfaces opposing each other and adjacent to the principal surface and the pair of side surfaces; and
    a ridge portion between the principal surface and one of the end surfaces; and
  a plurality of external electrodes disposed at both end portions of the element body in a first direction in which the pair of end surfaces opposes each other, one of the plurality of external electrodes including:
    a sintered metal layer disposed on the respective end portion of the element body in contact with the ridge portion, an end edge of the sintered metal layer being positioned closer to the end surface than a maximum thickness position of the portion positioned on the principal surface, in the first direction; and
    a conductive resin layer including a portion positioned on and in contact with the principal surface and a portion positioned on the sintered metal layer, a thickness of the conductive resin layer gradually decreasing from the maximum thickness position to the portion positioned on the sintered metal layer, wherein when viewed from the first direction, a thickness of the portion positioned on the principal surface is larger at a center in a second direction in which the pair of side surfaces opposes each other than at an end in the second direction.

4. An electronic component device, comprising:
an electronic device; and
an electronic component solder-mounted on the electronic device, the electronic component including:
an element body of a rectangular parallelepiped shape including:
a principal surface arranged to constitute a mounting surface;
a pair of side surfaces opposing each other and adjacent to the principal surface;
a pair of end surfaces opposing each other and adjacent to the principal surface and the pair of side surfaces; and
a ridge portion between the principal surface and one of the end surfaces; and
a plurality of external electrodes disposed at both end portions of the element body in a first direction in which the pair of end surfaces opposes each other, one of the plurality of external electrodes including:
a sintered metal layer disposed on the respective end portion of the element body in contact with the ridge portion, an end edge of the sintered metal layer being positioned closer to the end surface than a maximum thickness position of the portion positioned on the principal surface, in the first direction; and
a conductive resin layer including a portion positioned on and in contact with the principal surface and a portion positioned on the sintered metal layer, a thickness of the conductive resin layer gradually decreasing from the maximum thickness position to the portion positioned on the sintered metal layer,
wherein the conductive resin layer further includes a portion positioned on the side surface, and
a maximum thickness of the portion positioned on the principal surface is larger than a maximum thickness of the portion positioned on the side surface.

5. An electronic component, comprising:
an element body of a rectangular parallelepiped shape including:
a principal surface arranged to constitute a mounting surface;
a pair of side surfaces opposing each other and adjacent to the principal surface; and
a pair of end surfaces opposing each other and adjacent to the principal surface and the pair of side surfaces; and
a plurality of external electrodes disposed at both end portions of the element body in a first direction in which the pair of end surfaces opposes each other, wherein
one of the plurality of external electrodes includes a sintered metal layer disposed on the respective end portion of the element body, and a conductive resin layer including a portion positioned on the principal surface and a portion positioned on the sintered metal layer, in the first direction, an end edge of the sintered metal layer is positioned closer to the end surface than a maximum thickness position of the portion positioned on the principal surface,
a thickness of the conductive resin layer gradually decreases from the maximum thickness position to the portion positioned on the sintered metal layer, and
a length from the maximum thickness position to an edge of the conductive resin layer, in the first direction is larger than a length from a reference plane to the maximum thickness position, in the first direction, the reference plane being defined as a plane including the end surface.

6. The electronic component according to claim 5, wherein
a length from the end edge of the sintered metal layer to the maximum thickness position, in the first direction is larger than a length from a reference plane to the end edge of the sintered metal layer, in the first direction, the reference plane being defined as a plane including the end surface.

7. The electronic component according to claim 5, wherein
the sintered metal layer includes no portion positioned on the principal surface.

8. The electronic component according to claim 5, wherein
a length from the maximum thickness position to an end edge of the conductive resin layer, in the first direction is larger than a length from the end edge of the sintered metal layer to the maximum thickness position, in the first direction.

9. The electronic component according to claim 5, wherein
the thickness of the conductive resin layer gradually decreases from the maximum thickness position to an end edge of the conductive resin layer.

10. The electronic component according to claim 5, wherein
when viewed from the first direction, a thickness of the portion positioned on the principal surface is larger at a center in a second direction in which the pair of side surfaces opposes each other than at an end in the second direction.

11. The electronic component according to claim 5, wherein
the conductive resin layer further includes a portion positioned on the side surface, and
a maximum thickness of the portion positioned on the principal surface is larger than a maximum thickness of the portion positioned on the side surface.

12. The electronic component according to claim 5, wherein
a maximum thickness of the portion positioned on the principal surface is equal to or larger than 30 µm.

13. The electronic component according to claim 5, wherein
the element body further includes a curved surface positioned between the end surface and the principal surface and having a predetermined radius of curvature,
the sinter metal layer is disposed on the end surface and on the curved surface, and
in a cross-section orthogonal to the end surface and the principal surface, a radius of curvature of a surface of the conductive resin layer is larger than the predetermined radius of curvature, and larger than a radius of curvature of a surface of the sinter metal layer.

14. The electronic component according to claim 5, wherein
the conductive resin layer continuously covers one part of the principal surface, one part of the end surface, and one part of each of the pair of side surfaces.

15. An electronic component, comprising:
an element body of a rectangular parallelepiped shape including:
a principal surface arranged to constitute a mounting surface;
a pair of side surfaces opposing each other and adjacent to the principal surface; and
a pair of end surfaces opposing each other and adjacent to the principal surface and the pair of side surfaces; and
a plurality of external electrodes disposed at both end portions of the element body in a first direction in which the pair of end surfaces opposes each other, wherein
one of the plurality of external electrodes includes a sintered metal layer disposed on the respective end portion of the element body, and a conductive resin layer including a portion positioned on the principal surface and a portion positioned on the sintered metal layer,
in the first direction, an end edge of the sintered metal layer is positioned closer to the end surface than a maximum thickness position of the portion positioned on the principal surface,
a thickness of the conductive resin layer gradually decreases from the maximum thickness position to the portion positioned on the sintered metal layer, and
when viewed from the first direction, a thickness of the portion positioned on the principal surface is larger at a center in a second direction in which the pair of side surfaces opposes each other than at an end in the second direction.

16. The electronic component according to claim 15, wherein
a length from the end edge of the sintered metal layer to the maximum thickness position, in the first direction is larger than a length from a reference plane to the end edge of the sintered metal layer, in the first direction, the reference plane being defined as a plane including the end surface.

17. The electronic component according to claim 15, wherein
the sintered metal layer includes no portion positioned on the principal surface.

18. The electronic component according to claim 15, wherein
a length from the maximum thickness position to an end edge of the conductive resin layer, in the first direction is larger than a length from a reference plane to the maximum thickness position, in the first direction, the reference plane being defined as a plane including the end surface.

19. The electronic component according to claim 15, wherein
a length from the maximum thickness position to an end edge of the conductive resin layer, in the first direction is larger than a length from the end edge of the sintered metal layer to the maximum thickness position, in the first direction.

20. The electronic component according to claim 15, wherein
the thickness of the conductive resin layer gradually decreases from the maximum thickness position to an end edge of the conductive resin layer.

21. The electronic component according to claim 15, wherein
the conductive resin layer further includes a portion positioned on the side surface, and
a maximum thickness of the portion positioned on the principal surface is larger than a maximum thickness of the portion positioned on the side surface.

22. The electronic component according to claim 15, wherein
a maximum thickness of the portion positioned on the principal surface is equal to or larger than 30 μm.

23. The electronic component according to claim 15, wherein
the element body further includes a curved surface positioned between the end surface and the principal surface and having a predetermined radius of curvature,
the sinter metal layer is disposed on the end surface and on the curved surface, and
in a cross-section orthogonal to the end surface and the principal surface, a radius of curvature of a surface of the conductive resin layer is larger than the predetermined radius of curvature, and larger than a radius of curvature of a surface of the sinter metal layer.

24. The electronic component according to claim 15, wherein
the conductive resin layer continuously covers one part of the principal surface, one part of the end surface, and one part of each of the pair of side surfaces.

25. An electronic component, comprising:
an element body of a rectangular parallelepiped shape including:
a principal surface arranged to constitute a mounting surface;
a pair of side surfaces opposing each other and adjacent to the principal surface; and
a pair of end surfaces opposing each other and adjacent to the principal surface and the pair of side surfaces; and
a plurality of external electrodes disposed at both end portions of the element body in a first direction in which the pair of end surfaces opposes each other, wherein
one of the plurality of external electrodes includes a sintered metal layer disposed on the respective end portion of the element body, and a conductive resin layer including a portion positioned on the principal surface and a portion positioned on the sintered metal layer,
in the first direction, an end edge of the sintered metal layer is positioned closer to the end surface than a maximum thickness position of the portion positioned on the principal surface,
a thickness of the conductive resin layer gradually decreases from the maximum thickness position to the portion positioned on the sintered metal layer, and
the conductive resin layer further includes a portion positioned on the side surface, and
a maximum thickness of the portion positioned on the principal surface is larger than a maximum thickness of the portion positioned on the side surface.

26. The electronic component according to claim 25, wherein
a length from the end edge of the sintered metal layer to the maximum thickness position, in the first direction is larger than a length from a reference plane to the end edge of the sintered metal layer, in the first direction, the reference plane being defined as a plane including the end surface.

27. The electronic component according to claim 25, wherein
the sintered metal layer includes no portion positioned on the principal surface.

28. The electronic component according to claim 25, wherein
a length from the maximum thickness position to an end edge of the conductive resin layer, in the first direction is larger than a length from a reference plane to the maximum thickness position, in the first direction, the reference plane being defined as a plane including the end surface.

29. The electronic component according to claim 25, wherein
a length from the maximum thickness position to an end edge of the conductive resin layer, in the first direction is larger than a length from the end edge of the sintered metal layer to the maximum thickness position, in the first direction.

30. The electronic component according to claim 25, wherein
the thickness of the conductive resin layer gradually decreases from the maximum thickness position to an end edge of the conductive resin layer.

31. The electronic component according to claim 25, wherein
when viewed from the first direction, a thickness of the portion positioned on the principal surface is larger at a center in a second direction in which the pair of side surfaces opposes each other than at an end in the second direction.

32. The electronic component according to claim 25, wherein
a maximum thickness of the portion positioned on the principal surface is equal to or larger than 30 μm.

33. The electronic component according to claim 25, wherein
the element body further includes a curved surface positioned between the end surface and the principal surface and having a predetermined radius of curvature,
the sinter metal layer is disposed on the end surface and on the curved surface, and
in a cross-section orthogonal to the end surface and the principal surface, a radius of curvature of a surface of the conductive resin layer is larger than the predetermined radius of curvature, and larger than a radius of curvature of a surface of the sinter metal layer.

34. The electronic component according to claim 25, wherein
the conductive resin layer continuously covers one part of the principal surface, one part of the end surface, and one part of each of the pair of side surfaces.

35. An electronic component, comprising:
an element body of a rectangular parallelepiped shape including:
a principal surface arranged to constitute a mounting surface;
a pair of side surfaces opposing each other and adjacent to the principal surface;
a pair of end surfaces opposing each other and adjacent to the principal surface and the pair of side surfaces; and
a ridge portion between one of the principal surfaces and one of the end surfaces; and
a plurality of external electrodes disposed at both end portions of the element body in a first direction in which the pair of end surfaces opposes each other, wherein
one of the plurality of external electrodes includes a sintered metal layer disposed on the respective end portion of the element body in contact with the ridge portion, and a conductive resin layer including a portion positioned on and in contact with the principal surface and a portion positioned on the sintered metal layer,
in the first direction, an end edge of the sintered metal layer is positioned closer to the end surface than a maximum thickness position of the portion positioned on the principal surface,
a thickness of the conductive resin layer gradually decreases from the maximum thickness position to the portion positioned on the sintered metal layer, and
a length from the end edge of the sintered metal layer to the maximum thickness position, in the first direction is larger than a length from a reference plane to the end edge of the sintered metal layer, in the first direction, the reference plane being defined as a plane including the end surface.

* * * * *